US010613533B1

(12) United States Patent
Payson et al.

(10) Patent No.: US 10,613,533 B1
(45) Date of Patent: Apr. 7, 2020

(54) AUTONOMOUS DELIVERY AND RETRIEVAL OF INVENTORY HOLDERS AT TRANSFER LOCATIONS

(71) Applicant: Amazon Technologies, Inc., Seattle, WA (US)

(72) Inventors: William Henry Payson, Mercer Island, WA (US); Edgar E. Blanco, Seattle, WA (US); Kerry Patrick Person, Seattle, WA (US); Eric Rimling, Seattle, WA (US); Joshua Adam Steinitz, Seattle, WA (US); Patrick Supanc, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 108 days.

(21) Appl. No.: 15/838,095

(22) Filed: Dec. 11, 2017

(51) Int. Cl.
| G05D 1/00 | (2006.01) |
| B65G 1/137 | (2006.01) |
| B65G 1/10 | (2006.01) |
| G06Q 10/08 | (2012.01) |
| G06Q 50/28 | (2012.01) |

(52) U.S. Cl.
CPC ............ *G05D 1/0088* (2013.01); *B65G 1/10* (2013.01); *B65G 1/1375* (2013.01); *G06Q 10/087* (2013.01); *G06Q 10/08355* (2013.01); *G06Q 50/28* (2013.01); *G05D 2201/0213* (2013.01); *G05D 2201/0216* (2013.01)

(58) Field of Classification Search
CPC ......... G05D 1/0088; G05D 2201/0216; G05D 2201/0213; G06Q 50/28; G06Q 10/08355; G06Q 10/087; B65G 1/1375
See application file for complete search history.

(56) References Cited

U.S. PATENT DOCUMENTS

| 10,373,097 | B2 * | 8/2019 | Kulkarni | G08G 5/0034 |
| 10,459,450 | B2 * | 10/2019 | Sibley | G05D 1/0225 |
| 2014/0214196 | A1 * | 7/2014 | Worsley | B65G 1/10 |
| | | | | 700/217 |
| 2015/0117995 | A1 * | 4/2015 | D'Andrea | G06Q 10/08 |
| | | | | 414/467 |
| 2018/0089619 | A1 * | 3/2018 | High | G06Q 10/0832 |
| 2018/0141752 | A1 * | 5/2018 | Nakanishi | B65G 1/137 |

* cited by examiner

*Primary Examiner* — Michael J Zanelli
(74) *Attorney, Agent, or Firm* — Athorus, PLLC

(57) ABSTRACT

The present disclosure describes delivery and/or retrieval of inventory holders to different transfer locations using an automated ground vehicle. In accordance with the described implementations, rather than the vehicle waiting at the transfer location for the agents to arrive and retrieve the items from the inventory holder, the autonomous ground vehicle, working in conjunction with an autonomous transition unit that accompanies the vehicle, transfer the inventory holder containing the items to the transfer location and departs without waiting for the agents to retrieve the items from the inventory holder and continues on to another transfer location at which it will deliver another inventory holder and/or retrieve an inventory holder. Once all the items have been retrieved from an inventory holder delivered to a transfer location, the autonomous ground vehicle may update its route to navigate back to the transfer location and retrieve the inventory holder.

18 Claims, 16 Drawing Sheets

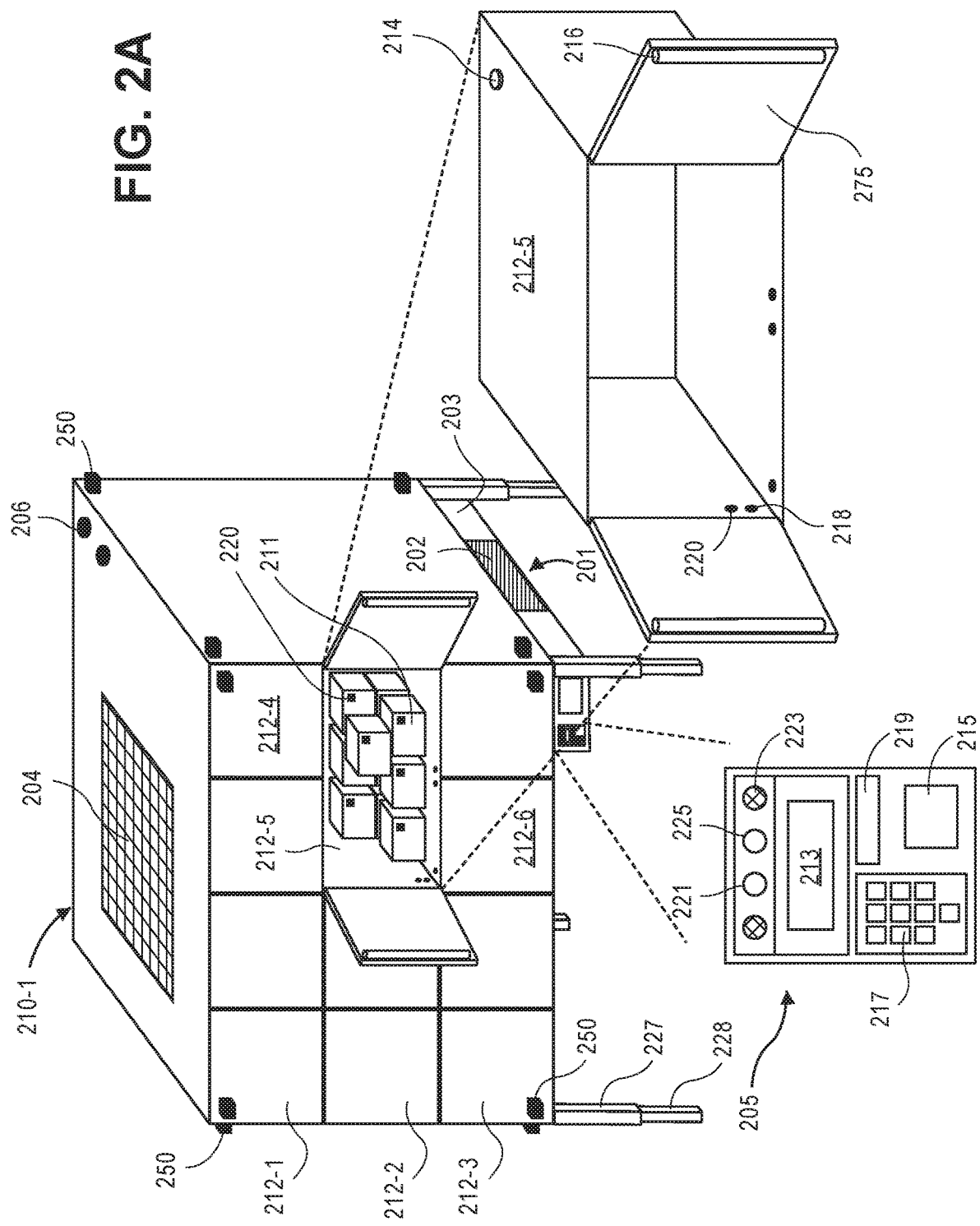

AUTONOMOUS DELIVERY AND RETRIEVAL OF INVENTORY HOLDERS AT TRANSFER LOCATIONS

BACKGROUND

Currently, many people purchase items through an electronic commerce marketplace and have those items delivered to a customer specified delivery destination, such as their home. Items may be picked from inventory locations, packaged and shipped to the customer specified delivery location. Currently, shipment of the item may involve several different carriers that transport the item from one location to another as the item progress through a transportation network toward the ultimate delivery destination.

Each time the package exchanges hands between carriers and/or at different locations, one or more agents typically handle the item, or the package containing the item, and/or wait from another agent with which they are to exchange the item. With each exchange or handling of the item, the cost of delivery of the item increases, the opportunity for error or misdirection of the item increases, and the overall time required to deliver the item to the final delivery destination increases.

BRIEF DESCRIPTION OF THE DRAWINGS

FIGS. 2A and 2B illustrate example inventory holders that may be delivered or retrieved by an autonomous ground vehicle, in accordance with implementations of the present disclosure.

DETAILED DESCRIPTION

Figure 1A:
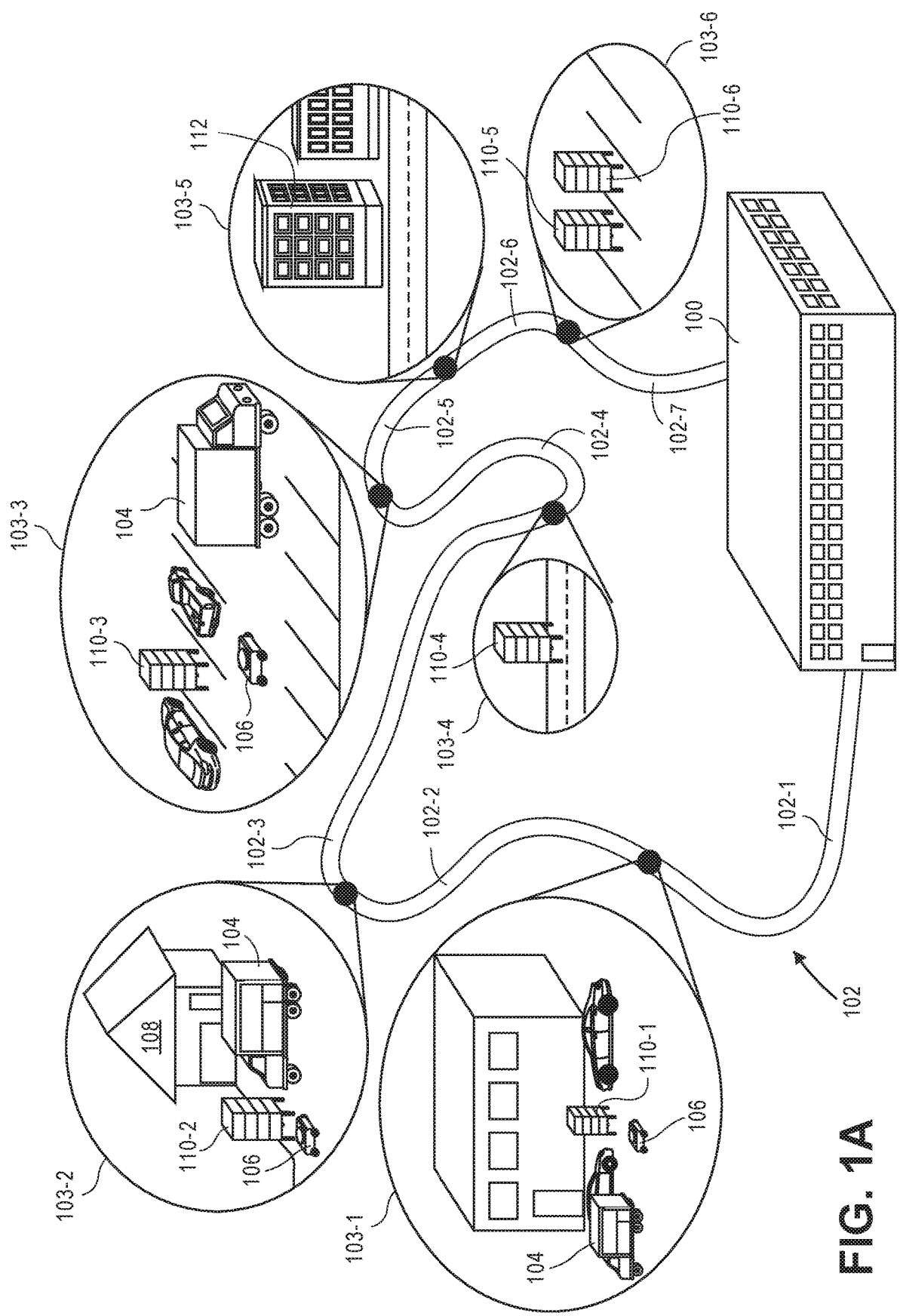
FIG. 1A is a view of a route followed by an autonomous ground vehicle to autonomously deliver inventory holders to transfer locations and autonomously retrieve inventory holders from transfer locations, in accordance with implementations of the present disclosure.

As is set forth in greater detail below, the present disclosure is directed to a system, method, and apparatus for autonomously delivering inventory holders to transfer locations and autonomously retrieving inventory holders transfer locations. An inventory holder may contain any number of items scheduled for final delivery to one or more delivery destinations, such as customer specified delivery destinations (e.g., home, business). In some implementations, the inventory holder may contain different sets of items, each set designated for final delivery to delivery destinations within different zones. For example, an inventory holder may contain a first set of a first plurality of items for final delivery to delivery destinations within a first zone and a second set of a second plurality of items for final delivery to delivery destinations within a second zone.

With the described implementations, rather than waiting for agents to retrieve items from a transfer location for final delivery, an autonomous ground vehicle ("AGV") may autonomously navigate to a transfer location, complete delivery of an inventory holder at the transfer location, and depart, without waiting for agents to retrieve the items from the inventory holder, to continue delivering other inventory holders to other transfer locations and/or retrieving inventory holders from other transfer locations. When an inventory holder is delivered to a transfer location, one or more agents that are to complete delivery of items contained in the inventory holder to final delivery destinations may be notified of the arrival of the inventory holder at the transfer location. The agents, upon receiving the notification, retrieve items from the inventory holder and complete final delivery of those items to respective delivery destinations.

When all items have been removed from the inventory holder, a notification or other beacon may be transmitted by the inventory holder to message that the inventory holder is available for retrieval. Upon receiving a notification of an empty inventory holder, an AGV that has or will have available capacity to retrieve the inventory holder from the transfer location is notified and the transfer location added to a route plan for the AGV. The AGV, upon reaching the transfer location, autonomously loads the inventory holder into the AGV and departs to continue delivering other inventory holders to other transfer locations and/or retrieving other inventory holders from other transfer locations.

With the described implementations, a greater efficiency is gained by reducing or eliminating wait times at transfer locations by an agent either waiting for a delivery vehicle to arrive with items to be delivered by the agent and/or by the delivery vehicle having to wait at the transfer location for agents to arrive and receive items to be delivered by the agents. By reducing or eliminating those wait times, the cost to deliver items to a delivery destination is reduced. Likewise, the inventory holder may be climate controlled, thereby increasing the variety and selection of items that may transported for final delivery. Still further, in some implementations, the packing used to contain items as they are in transit to a delivery destination may be reduced or eliminated. For example, rather than packing an item in a corrugated container and possibly adding dunnage to protect the item during transit, the item may either not be packed and placed directly into the inventory holder for transport, or may be packaged in a bag, such as a recyclable bag. The inventory holder may provide protection during transport of the item and the bag may provide privacy to the user to which the item is being delivered by overwrapping the item with the bag. Likewise, labeling or other markings may be affixed to the bag to facilitate identification and ultimate delivery by the agent.

As discussed further below, an AGV may by any form or type of autonomous vehicle that is capable of autonomously navigating between transfer locations to enable delivery and retrieval of inventory holders at those locations. In some implementations, the AGV may be approximately the size of a standard van or bus and operable to contain approximately eight inventory holders and an autonomous transition unit ("ATU"). In other implementations, the AGV may be larger or smaller and may be configured to contain and carry additional or fewer inventory holders and/or additional or fewer ATUs. The ATU accompanying the AGV may be an autonomous vehicle that is operable to lift and navigate the inventory holders independent of the AGV. In such an example, the ATU may ride within the AGV between transfer locations and then transition the appropriate inventory holder(s) into or out of the AGV while at the transfer location.

A transfer location may be any location at which an inventory holder may be placed. For example, a transfer location may range from an empty spot on the side of a street to a secure facility configured to receive inventory holders. Other examples of transfer locations include, but are not limited to, parking spaces in parking lots or parking structures, open fields, driveways, sidewalks, etc.

The routes for an AGV between different transfer locations may be defined and/or updated based on any number or type of relevant factors, including but not limited to dimensions or attributes of inventory holders to be delivered, positioning of inventory holders within the AGV, capacity of the AGV, delivery timeframes for items contained in the inventory holders, availability of inventory holders for retrieval, availability of agents, traffic, weather, time of day, etc. For example, a route for an AGV to deliver/retrieve inventory holders may be planned for inventory holders loaded onto the AGV while the AGV is at a fulfillment center. As the AGV navigates the route, one or more inventory holders in the field (i.e., at a transfer location) may become available for retrieval. Upon detecting an inventory holder available for retrieval, if the AGV has or will have capacity to retrieve the inventory holder, the route of the AGV may be updated so that the route includes navigation by the AGV to the transfer location at which the inventory holder available for retrieval is located, and autonomous retrieval of the inventory holder.

As will be appreciated, the AGV may continuously navigate between transfer locations, stopping only to delivery or retrieve an inventory holder or to replenish the fuel supply of the AGV. Accordingly, in some implementations, one or more fulfillment centers may be considered a transfer location by the AGV such that the AGV may simply include the fulfillment center as part of their route, autonomously navigate to the fulfillment center, retrieve one or more inventory holders from the fulfillment center and/or deliver one or more inventory holders to the fulfillment center (e.g., an empty inventory holder retrieved from another transfer location), and continue along its route to the next transfer location.

The information or data upon which a route may be defined or updated may be obtained by any means, including but not limited to sensors provided on one or more AGVs traveling within a geographic area or environment in which the route is located, e.g., along one or more roads within a zone in which the AGV is operating. In some implementations, AGVs and/or ATUs may be outfitted with any number of sensors (e.g., Global Positioning Satellite, or GPS, receivers, digital cameras or other imaging devices, speedometers, inclinometers, compasses, altimeters, gyroscopes or scanners. An AGV traveling on a route may be configured to capture information or data regarding conditions along the route using one or more of such sensors, and to utilize such information or data to continuously evaluate the route on which the AGV is traveling, or to alter the route. For example, the AGV may use such information or data to modify the route on which the AGV is traveling, e.g., by adding or removing one or more of the paths within the route, or by updating estimated times of arrival at a transfer location.

Alternatively, the AGV may transmit such information or data to a central vehicle monitoring system that is in communication with one or more of a fleet of AGVs. The central vehicle monitoring system may be configured to define routes based on such information or data, select or plan one or more optimal routes for a given AGV, or generate or update routes currently being navigated by AGVs. The central vehicle monitoring system may be located in a physical location within the environment, or in one or more alternate or virtual locations, e.g., in a "cloud"-based environment. Additionally, the various routes navigated by AGVs may be generated or updated based on information or data obtained from one or more extrinsic sources, including but not limited to satellite imagery, traffic or weather data, news reports, or any networked computer systems.

FIG. 1A is a view of a route followed by an autonomous ground vehicle to autonomously deliver inventory holders to transfer locations and autonomously retrieve inventory holders from transfer locations, in accordance with implementations of the present disclosure. As shown, an AGV 104 may navigate along a path, such as path 102-1, of a route 102 to different transfer locations 103. As discussed herein, a route may include two or more transfer locations between which an AGV is to navigate. A path is the path along the route between each pair of transfer locations. The example illustrated in FIG. 1A includes one route 102 with seven paths 102-1, 102-2, 102-3, 102-4, 102-5, 102-6, and 102-7.

As discussed further below, an AGV may be loaded with one or more inventory holders 110 that are to be autonomously transported to different transfer locations 103 and transferred from the AGV to the transfer location so that one or more agents (aka last mile carriers) can access the inventory holder to obtain items that the agents are to deliver to final delivery destinations. For example, the AGV 104 may be loaded with six inventory holders while positioned at a fulfillment center 100. Once loaded, the AGV may receive route information, such as an indication of the location of each transfer location at which the inventory holders are to be delivered.

Figure 1B:
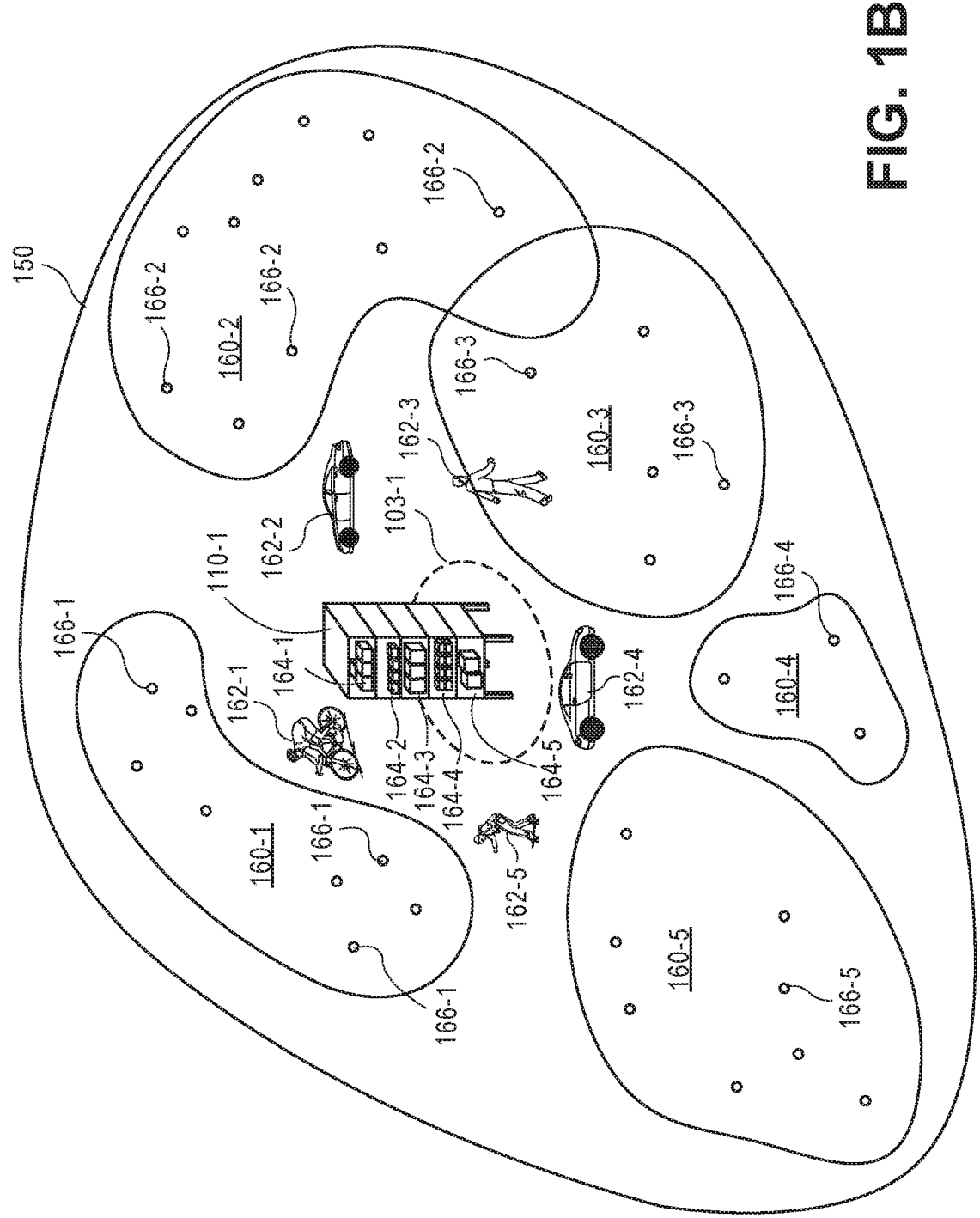
FIG. 1B is an example of a region and zones within a region that are served by an inventory holder placed at a transfer location, in accordance with implementations of the present disclosure.

An inventory holder may contain items scheduled for final delivery to delivery destinations within a region. Each region may be further subdivided into two or more zones. An agent may access an inventory holder and obtain items scheduled for delivery at delivery destinations within a zone. For example, FIG. 1B illustrates a region 150 corresponding to the first inventory holder 110-1, delivered to transfer location 103-1. In the illustrated example, the first inventory holder 110-1 includes five sets of items 164-1, 164-2, 164-3, 164-4, 164-5. Each set of items 164 are to be retrieved by a different agent 162-1, 162-2, 162-3, 162-4, and 162-5, and each retrieving agent 162 delivers the items of a set to delivery destinations 166-1, 166-2, 166-3, 166-4, and 166-5 within each of the different zones 160-1, 160-2, 160-3, 160-4, and 160-5 within the region 150.

For example, a first agent 162-1 may retrieve a first plurality of items 164-1 from a first compartment of the inventory holder 110-1 while the first inventory holder is positioned at the first transfer location 103-1, and deliver those items to different delivery destinations 166-1 within the first zone 160-1. A second agent 162-2 may retrieve a second plurality of items 164-2 from a second compartment of the first inventory holder 110-1 while the first inventory holder is positioned at the first transfer location 103-1, and deliver those items to different delivery destinations 166-2 within the second zone 160-2. A third agent 162-3 may retrieve a third plurality of items 164-3 from a third compartment of the first inventory holder 110-1 while the first inventory holder is positioned at the first transfer location 103-1, and deliver those items to different delivery destinations 166-3 within the third zone 160-3. A fourth agent 162-4 may retrieve a fourth plurality of items 164-4 from a fourth compartment of the first inventory holder 110-1 while the first inventory holder is positioned at the first transfer location 103-1, and deliver those items to different delivery destinations 166-4 within the fourth zone 160-4. A fifth agent 162-5 may retrieve a fifth plurality of items 164-5 from a fifth compartment of the first inventory holder 110-1 while the first inventory holder is positioned at the first transfer location 103-1, and deliver those items to different delivery destinations 166-5 within the fifth zone 160-4.

As will be appreciated, a region may include any number of zones, including one zone, and the illustration is provided only as an example. Likewise, any number of items may be delivered to any number of delivery destinations of each zone and some zones may have more deliveries and/or delivery destinations than other zones. Likewise, zones and/or regions may or may not overlap. Still further, agents may be any type of agent capable of transporting items from the inventory holder 110-1 to delivery destinations 166 within a respective zone. Agents may be human, robotic, manned, or autonomous. In some implementations, the agents may include aerial vehicles, such as unmanned aerial vehicles. Likewise, agents may use one or more modes of transportation to transport items from the transfer location to the final delivery destinations. For example, the first agent 162-1 may ride a bicycle, the second agent 162-2 may utilize an automobile, the third agent 162-3 may walk, the fourth agent 162-4 may also use an automobile, and the fifth agent, in this example, is riding a skateboard. Other modes of transportations may include, but are not limited to, animals (e.g., horses), scooters, wagons, carts, water based vehicles, aerial vehicles, etc.

Utilizing the disclosed implementations, rather than requiring the AGV to remain at the transfer location while the agents arrive to retrieve the items they are to deliver to final delivery destinations, or require the agents to arrive at the transfer location early and wait for the arrival of the AGV, the AGV can deliver the inventory holder to the delivery location and depart without waiting for the agents to retrieve the items. As such, the AGV is able to continue along the route and deliver inventory holders to other transfer locations and/or retrieve inventory holders from other transfer locations. Not only do the disclosed implementations automate a leg of item delivery, they reduce weight time by agents at the transfer locations, make delivery of a larger number of items more efficient using a single AGV carrying multiple inventory holders, and also reduce the overall time required to deliver items.

In addition to agents 162 retrieving items from an inventory holder 110-1 for delivery to various delivery destinations, in some implementations, the inventory holder 110-1 may receive items from agents, users, customers, or other persons while the inventory holder is positioned at the transfer location 103-1. Items that are received into the inventory holder may include, for example, items to be returned, items to be shipped from one customer to another customer, and/or items to be shipped from one location to another location. For example, an agent may receive an item that is to be returned. As part of the return process, the agent may be provided with location information for the inventory holder 110-1 indicating the position of the inventory holder at the transfer location and/or a duration of time that the inventory will remain at the transfer location, and the agent may return the item into the inventory holder 110-1. In addition to the location information, the agent may receive a code or other identifier that the agent provides to the inventory holder to facilitate a return of the item into the inventory holder.

Returning FIG. 1A, when the AGV arrives at the first transfer location 103-1, which is an empty parking space on a street, an ATU 106 that rides along with the AGV 104 transfers the first inventory holder 110-1 from the AGV and to the first transfer location. Once the delivery of the first inventory holder 110-1 to the first transfer location 103-1 is complete and the ATU 106 has returned to an interior of the AGV 104, the AGV may depart the first transfer location 103-1 without waiting for the agents 162 (FIG. 1B) to arrive at the first transfer location 103-1 and retrieve the items that are to be delivered to the final delivery destinations.

In this example, when the AGV 104 departs the first transfer location 103-1, the AGV autonomously navigates to the second transfer location 103-2 so that the ATU 106 can transfer the second inventory holder 110-2 from the AGV 104 to the second transfer location. In this example, the second transfer location is an agent's home 108.

Again, once the second inventory holder has been delivered to the second transfer location 103-2, the AGV may depart the transfer location and continue along the route for that AGV. In this example, the next inventory holder to be delivered is scheduled for delivery to the third transfer location 103-3. However, at some point prior to the AGV arriving at the third transfer location, the AGV 104 receives a notification that an inventory holder 110-4 is available for retrieval at a fourth transfer location 103-4. The AGV and/or the vehicle monitoring system (discussed below) determines when capacity along the route will be available for the AGV to retrieve and transport the inventory holder 110-4 and adjusts the route to include the fourth transfer location 103-4. The AGV may also consider the location of the transfer location for which retrieval is to occur and adjust the route to include paths to and from the transfer location 103-4 that are efficient from a distance and/or time consideration.

In this example, the AGV determines that it has capacity to retrieve the inventory holder and that retrieval of the inventory holder should occur between second transfer location 103-2 and the third transfer location 103-3. Based on the determination, the route is updated to include a path from the second transfer location 103-2 to the fourth transfer location 103-4 and a path 102-4 from the fourth transfer location 103-4 to the third transfer location 103-3.

When the AGV 104 arrives at the fourth transfer location, the ATU 106 transfers the inventory holder 110-4 from the fourth transfer location 103-4 into the storage compartment of the AGV 104. Upon loading the inventory holder into the AGV, the AGV may depart the fourth transfer location 103-4 and navigate along the path 102-4 to the third transfer location 103-3, in this example a parking lot. Again, when the AGV arrives at the third transfer location 103-3, the ATU 106 transfers the third inventory holder 110-3 from the AGV 104 to a position at the third transfer location, in this example an empty parking stall in the parking lot.

Upon completion of the delivery of the third inventory holder 110-3 to the third transfer location 103-3, and without waiting for agents to arrive at the third transfer location to retrieve the items to be delivered to final delivery destinations, the AGV 104 departs the third transfer location and autonomously navigates along the path 102-5 from the third transfer location to the fifth transfer location 103-5.

In this example, the fifth transfer location 103-5 is a secure transfer location in that the inventory holder may be delivered to a secure or controlled environment. A secured transfer location may be any type of location at which a monitoring or limited access to the inventory holder by unauthorized persons is limited. For example, but not by way of limitation, a secured transfer location may be a limited access garage, such as a garage at an apartment building 112 or convenience store, a fulfillment center, such as fulfillment center 100, a location that is monitored by security cameras and/or security personnel, etc. As discussed further below, different types of inventory holders may be delivered to secured transfer location compared to other transfer locations.

In this example, when the AGV arrives at the fifth transfer location 103-5, the ATU transfers the fifth inventory holder from the AGV to the fifth transfer location. However, in this example, it is determined that the AGV is to wait until all the items have been retrieved from the fifth inventory holder and to take the fifth inventory holder when departing. Determining that the AGV is to remain at the transfer location may be based on, for example, whether there are other transfer locations along the route at which the AGV is to deliver items, whether all the agents are available to retrieve the items, etc. In this example, the fifth inventory holder includes items for final delivery to delivery destinations within the apartment building 103-3 and an agent is available at the apartment building to retrieve the items from the inventory holder.

Finally, after the AGV departs the fifth transfer location, the AGV navigates a path 102-6 to the sixth transfer location 103-6, which in this example includes two inventory holders 110-5, and 110-6 that are to be retrieved. In addition, the AGV is to deliver another inventory holder to the sixth transfer location. In this example, when the AGV arrives at the sixth location, the ATU will transfer the inventory contained in the AGV that is to be delivered to the sixth transfer location 103-6 from the AGV to the sixth transfer location and transfer the two inventory holders 110-5 and 110-6 from the sixth transfer location into the AGV.

Finally, once the inventory holders are transferred at the sixth transfer location 103-6, the AGV 104 autonomously navigates the path 102-7 back to the fulfillment center 100.

While the illustrated example discusses the AGV navigating a path between several transfer locations and back to the fulfillment center 100, in other implementations, the AGV may treat the fulfillment center as another transfer location. In such an example, as the AGV is navigating different paths, when the fulfillment center has one or more inventory holders filled with items that are to be delivered to different transfer locations, a notification may be sent to the AGV indicating that there are inventory holders available for retrieval at the fulfillment center. The AGV 104 or vehicle monitoring system, upon receiving the notification, will determine when the AGV will have capacity to retrieve the inventory holders and/or to deliver inventory holders to the fulfillment center, such as those inventory holders that the AGV has retrieved from other transfer locations. A path will then be planned along the AGV route to navigate to the fulfillment center 100 as if the fulfillment center is another transfer location.

In still other examples, while not shown in FIG. 1A, when an inventory holder, such as the first inventory holder 110-1 is available for retrieval (i.e., after all the agents have retrieved the items from the inventory holder) a notification may be sent to the AGV 104 and the AGV may plan a path to the first transfer location and retrieve the first inventory holder as part of the AGVs route.

FIG. 2A depicts an example inventory holder 210-1, in accordance with implementations of the present disclosure. The inventory holder 210-1 may include one or more control stations 201 that acts as the central control point for the inventory holder 210-1, providing power, computing resources, user input and network access to the inventory holder 210-1. For example, control station 201 may include a computing system 202 that is capable of maintaining state information for each storage compartment at the inventory holder 210-1 and providing other computing functions. For example, the computing system 202 may include a command component that maintains information as to which storage compartments of the inventory holder 210-1 are empty, which storage compartments include items, the access code(s) or other identifier(s) necessary to open each of the storage compartments and any other information necessary to maintain the inventory holder. The command component may also issue commands or instructions to the storage compartment modules to lock/unlock storage compartments, active sensors, and the like. The inventory holder 210-1 may be configured to obtain information from a remote computing resource, AGV, ATV, vehicle management system, or materials handling facility, or may be configured to operate primarily as a stand-alone unit.

The control station 201 may also include an interface 205. The interface 205 is configured to receive and provide information to one or more agents accessing the inventory holder 210-1 and may include, but is not limited to, a display 213, such as a touch-screen display, a scanner 215, a keypad 217, a biometric scanner 219, an audio transducer 221, one or more speakers 223, one or more image capture devices 225, such as a video camera, and any other types of input or output devices that may support interaction between the inventory holder 210-1 and one or more agents. For example, the interface 205 may also include a radio frequency identification tag (RFID) reader that can detect an RFID tag associated with an agent. In still other examples, the control station 201 may include wireless communication interfaces, such as Bluetooth, Near Field Communication (NFC), and the like to detect the presence of one or more beacons or identifiers that may be used to identify an agent at the inventory holder 210-1.

The control station 201 may be coupled with and communicate through one or more antennas 206 that provide wireless communication between the inventory holder and other components, such as the AGV, ATU, etc. Any form of wireless communication may be utilized including Wi-Fi, cellular, satellite, etc.

The control station may be powered by one or more power modules, such as power module 203 and/or solar panel 204. The power module may provide any form of power to the inventory holder and may be, for example a battery, super capacitor, or other form. In some implementations, the power supplies may be configured to recharge when the inventory holder is stored in an AGV during transport to or from a transfer location. For example, one or more legs 227 of the inventory holder 210-1 may include a coupling for connecting the power supply 203 to one or more charging sources of an AGV to enable the power supply to recharge as the inventory holder 210-1 is transported by the AGV.

The inventory holder also includes one more storage compartments, such as storage compartments 212-1, 212-2, 212-3, 212-4, 212-5, and 212-6. The storage compartments 212 may be of varying sizes and number. Likewise, some or all of the storage compartments may be climate controlled and operable to properly store hot or cold items.

Each storage compartment 212 of the inventory holder 210-1 includes an upper, bottom, side and rear surface and at least one door 275 configured to form a cavity in which items 211 may be stored and made accessible to agents that are to deliver those items to one or more final delivery destinations. As discussed above, multiple items for delivery by an agent to different final delivery destinations may be maintained in a single storage compartment 212 of an inventory holder and made accessible to the agent that is to deliver those items to the final delivery destinations.

In some implementations, one or more of the items 211, or a container/package in which the item is contained, may include one or more identifiers, such as a radio frequency identification (RFID) tag that may be used or detected by the control station 201 of the inventory holder to track the location and/or presence of items maintained in storage compartments 212 of the inventory holder. For example, one or more antennas may be included in the different storage compartments of the inventory holder, and the control station may periodically activate the antennas to obtain RFID 220 information for items 211 stored in the various storage compartments. In other implementations, other visual, passive, or active tags may be included on items 211 and utilized to determine a location or presence of items within storage compartments 212 of the inventory holder 210.

In addition, each storage compartment may include various security or other components. For example, looking at the expanded view of storage compartment 212-5, the storage compartment may include a locking mechanism 216, which may be controlled by the control station 201, a presence detection sensor 218, motion sensor 220, and/or an image capture device 214. The locking mechanism 216 may be controlled by the control station 201, either through wired or wireless communication, to effect locking and unlocking of the door 275 of the storage compartment 212-5. For example, when an agent interacts with the control station 201 via the display 213 and provides an access code or other identifier, the control station 201 may identify a specific storage compartment associated with the access code or other identifier and the command component may wirelessly send instructions to unlock a storage compartment 212. The instructions may include a command (e.g., unlock), an address or identifier of the specific storage compartment and any other information necessary for communication between the control station 201 and the storage compartment 212. In response to receiving the instructions, a locking mechanism that moves the pins of the locking mechanism 216 on the door 275 of the identified storage compartment 212-5 such that the pins retract, thereby disengaging the lock of the storage compartment 212-5 allowing the door 275 to open. In some implementations, the storage compartment 212-5 may also include a spring mechanism such that when the locking mechanism 216 of the storage compartment 212 is disengaged, the spring mechanism propels the door 275 outward, thereby identifying to an agent that the door 275 is unlocked and the storage compartment 212 is accessible.

While the locking mechanism described above utilizes retractable pins, any mechanical, magnetic, electrical or other form of locking mechanism may be utilized with the various implements described herein. In addition, the storage compartment 212 may also include magnets to help retrieve and close a door when it is not all the way closed. Also, the locking mechanism of different storage compartments may be the same or different.

The presence detection sensor 218 may be used to detect the presence or absence of objects in the storage compartment 212-5. For example, the presence sensor 218 and/or motion sensor 220 may be used when an agent is retrieving items stored in the storage compartment 212. For example, when an agent interacts with the control station 201 via the touch control display 213 and provides an access code such that a storage compartment 212-5 is opened, the presence detection sensor 218 and/or motion sensor 220 may be used to confirm that the agent has reached into the storage compartment 212-5 and removed its contents, prior to allowing the storage compartment door 275 to be closed and locked with the locking mechanism 216. In some implementations, there may be multiple presence detection sensors 218 and/or motion sensors 220 distributed throughout the inside of a storage compartment to ensure objects/motion is detected. In still another implementation, the bottom of the storage compartment may include protrusions or rises to position thin items, so they are detected by the presence detection sensor 218.

The storage compartments, such as storage compartment 212-5, may also include an image capture device 214, such as a camera, and optionally an illumination component, such as a light emitting diode (LED), that may be used to illuminate the inside of the storage compartment 212. The image capture device 214 may also be used to the detect presence or absence of items within the storage compartment 212, detect the item itself, as well as for security. For example, the image capture device 214 may be used to identify the type and/or quantity of items located within the storage compartment 212 and/or to identify or record video/images of access with the storage compartment 212. In addition, the image capture device 214 may be used to determine the amount of space available in the storage compartment 212. For example, an image taken by the image capture device 214 may be transmitted via wired or wireless communication to the control station 201 and the control station 201 may determine the amount of space available in the storage compartment 212. Such information may be used to determine if all items for a zone will fit in a single storage compartment 212, if all items associated with a storage compartment are present in the storage compartment, or if the items to be delivered within a zone need to be divided across multiple storage compartments of the inventory holder 210-1.

The inventory holder 210-1 may also include self-leveling feet 228 that may extend from the legs 227 of the storage compartment 212 and be used to level the storage compartment 212 when located on un-level surfaces. As an alternative to self-leveling feet 228, any other type of support mechanism may be utilized with various implementations described herein for supporting the inventory holder when the inventory holder is placed on an uneven or unlevel surface.

The inventory holder may also include one or more power supplies 203, such as battery power and/or solar power 204 to provide power to the inventory holder and to enable operation of the control station 201 and interface 205.

Finally, because the inventory holders may be transported by an AGV with other inventory holders, one or more spacers 250 or cushions may be mounted to the sides of the inventory holder 210-1 to provide a defined level of separation between the inventory holders 210 when stowed in the interior of the AGV. The spacers 250 may be rubber spacers or other form of flexible material that when in contact with another inventory holder, or other object, will keep a defined separation between the inventory holder 210-1 and the other object.

The inventory holder illustrated in FIG. 2A may be utilized for delivery to unsecured transfer locations, such as parking lots, streets, sidewalks, etc., because the storage compartments of the inventory holder are secured and access to the storage compartments is accessible only upon authentication of the agent that is to retrieve the item for final delivery.

Figure 2B:
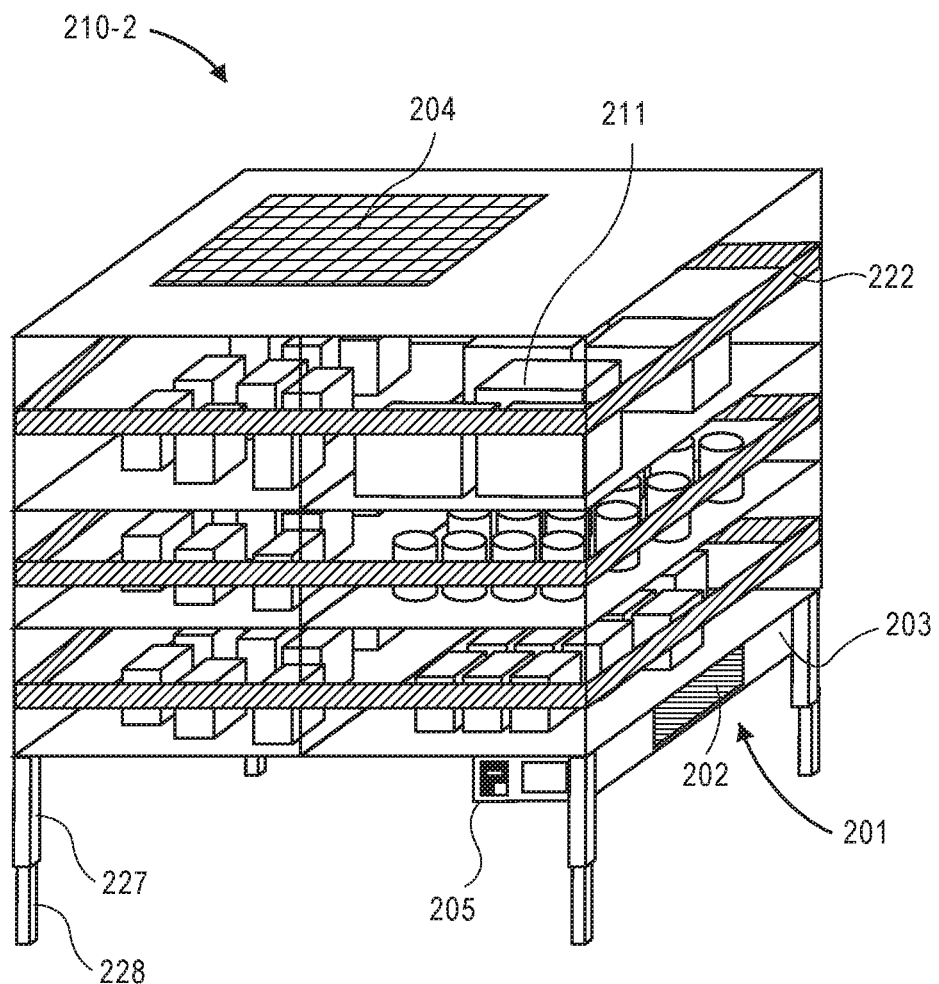

In other implementations, a simplified inventory holder may be utilized when delivery of the storage compartment is to a secure location. For example, referring to FIG. 2B, illustrated is an inventory holder 210-2 that may be utilized when the inventory holder is delivered to a secure transfer location. As illustrated, the inventory holder 210-2 may include many of the same components as the inventory holder 210-1, such as the control station 201, computing system 202, user interface 205, power supply 203 and/or solar panel 204, legs 227 and adjustable feet 228. However, because the inventory holder is being utilized in secure transfer locations, it may not include any doors or other barriers and the storage compartments may be open so that agents can access the inventory items 211 without having to provide an access code or other identifier. In some implementations, because there may be no doors or walls to the storage compartments, a retaining band 222 may surround the storage compartments to assist in keeping items 211 from shifting during transit and falling out of the storage compartment and/or off of the inventory holder 210-2.

As will be appreciated, any number and/or types of configurations of inventory holders may be utilized with the disclosed implementations and the two discussed with respect to FIGS. 2A and 2B are provided only as examples.

While the AGV is navigating paths between transfer locations and/or as an ATU is navigating to and from the AGV at a transfer location, the AGV and/or ATU may evaluate its surroundings using one or more sensors, e.g., by capturing imaging data or other information regarding weather, traffic, accessibility or any other relevant factors. The AGV 104 and/or ATU 106 may be configured to report information or data regarding its transit along the different paths and/or at the different transfer locations.

The recorded information and/or information from other sources may be utilized by the AGV in path planning between two transfer locations. For example, while automobiles such as cars or trucks are sufficiently versatile to drive on various types of roadways including expressways, streets or driveways, the speed by which a car or a truck may travel is limited by the capacity of such roadways, as well as any associated regulatory restrictions (e.g., speed limits) or traffic conditions existing thereon. While each such mode of transport may accommodate both passengers and cargo to travel thereon, transportation on all modes may be slowed or halted by incidents of varying degrees. To a certain extent, a transportation network that is clogged by one participant, e.g., a traffic accident on a roadway, or construction on a sidewalk in a park, is frequently clogged to all participants.

Conversely, while roadways are typically designed to accommodate a maximum theoretical capacity of vehicle traffic, many roadways are used at less than a maximum capacity, or remain entirely unused, at many other times of a day. For example, roadways are commonly flush with traffic during "rush hour," or twice-daily periods of near-peak congestion usually occurring before and after traditional working hours, as well as other scheduled or unscheduled events or occurrences such as sporting events, "move-in" days at colleges or universities, or fairs or festivals. The same roadways that are packed with vehicles during "rush hour" or other peak periods may remain sparsely used, or entirely unused, during off-peak periods, e.g., on weekends, during overnight periods, or at other times.

Where a transportation network includes a plurality of points or nodes corresponding to transfer locations that are connected by one or more paths extending therebetween, an optimal route (or a shortest route), between two or more of the points of the transportation network may be determined according to one or more algorithms, formulas or techniques. Using points or nodes corresponding to transfer locations and dimensions or other attributes of roadways between such points or nodes, an optimal route for traveling between two transfer locations using the transportation network may be calculated using one or more iterations of common mathematical principles, including but not limited to Dijkstra's Algorithm, Bellman-Ford Algorithm, Floyd-Warshall Algorithm, Johnson's Algorithm or hub labeling. A path or route between two or more points of a transportation network may be defined as "shortest" or "optimal" on any basis, including but not limited to times of transit between the two or more points, economic costs, values of lost opportunities, or any other subjective or objective basis.

Additionally, such algorithms, formulas or techniques may also use any amount of geospatial information representative of locations corresponding to points or nodes, such as geolocations or street addresses of transfer locations, or of any other points or nodes, in determining an optimal route between two transfer locations. For example, geospatial information regarding a transfer location may be determined by providing a street address and/or description of the transfer location to a geocoder (e.g., a software application and/or hardware component configured to perform geocoding techniques), and a "geolocation," or a geospatially-referenced point that precisely defines an exact position in space of the transfer location. Geospatial information may also be ascertained from geographic information system (or "GIS") data, from information received via a GPS system, e.g., data received from one or more orbiting satellites, from information obtained using cellular telephone equipment configured to estimate (e.g., triangulate) a position from one or more cellular telephone network towers or other network sources, or from information determined by any other source. Geospatial information or other location information may be expressed in a two-dimensional Cartesian format, e.g., $(x_i, y_i)$, or latitudes and longitudes, or in a three-dimensional format, e.g., $(x_i, y_i, z_i)$ or latitudes, longitudes and altitudes, of any of such points.

The AGVs of the present disclosure that navigate between transfer locations along different routes may be vehicles having any number of wheels mounted to axles that may be rotated by one or more motors, with dimensions, masses or other indicators of size that may be selected on any basis. For example, in some implementations, such autonomous vehicles may be sized and configured to travel on roads at various times or during various levels of congestion, and at various speeds, e.g., in response to one or more computer-based instructions.

Additionally, AGVs of the present disclosure may include a storage compartment, or multiple storage compartments, for storing inventory holders, and optionally one or more ATUs, that accompany the AGV to different transfer locations. Such storage compartments may be used to securely maintain the inventory holders at any desired temperature, pressure, alignment or orientation, and to protect the inventory holders and the items contained therein against the elements. Furthermore, in some implementations, the AGV may include various equipment or components for determining whether a storage compartment is empty or includes one or more inventory holders and/or determine the position of inventory holders within the storage compartment.

Moreover, the AGVs of the present disclosure may include any number of sensors such as position sensors (e.g., Global Positioning Satellite, or GPS, receivers), imaging sensors (e.g., digital cameras or other imaging devices) or other sensors, including but not limited to speedometers, inclinometers, compasses, altimeters, gyroscopes or scanners. The AGVs of the present disclosure may also include communications equipment (e.g., wired or wireless means for communication such as components or systems operating Wireless Fidelity, or Wi-Fi, Bluetooth, near-field communications or cellular technologies or protocols), along with one or more power supplies (e.g., batteries, fossil fuel, solar power), which may be rechargeable, refuellable or replaceable in nature. Information or data obtained or determined by such sensors or such communications equipment may be utilized in autonomously controlling the AGV, e.g., in causing the AGV to navigate along paths. The AGVs of the present disclosure may further include any number of computer components (e.g., processors, data stores, transceivers or input/output devices) for performing any of the functions or accomplishing any of the missions or tasks described herein.

Figure 3A:
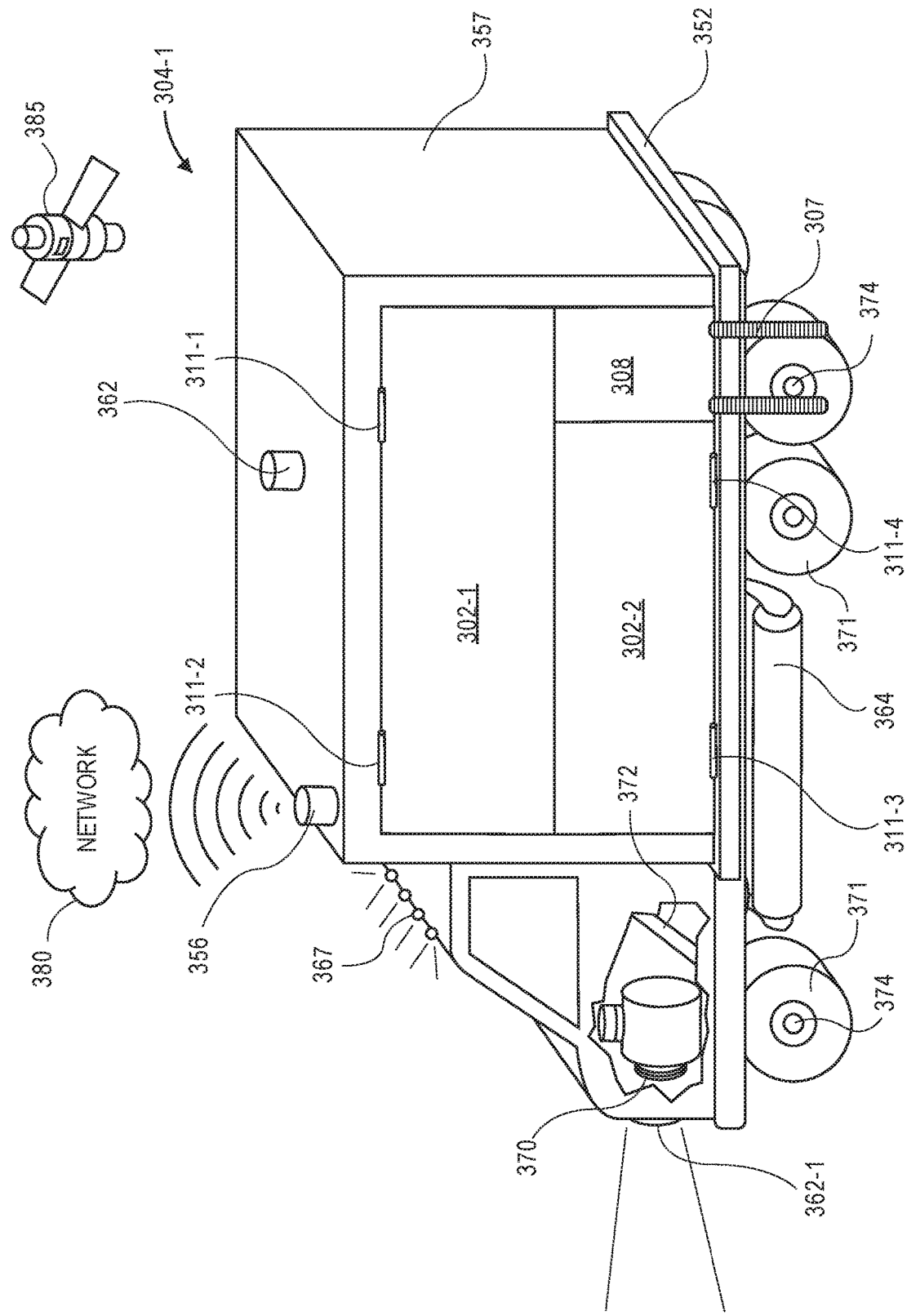
FIGS. 3A-3C illustrate an example autonomous ground vehicle, in accordance with implementations of the present disclosure.

Referring to FIG. 3A, a view of one AGV 304-1 in accordance with implementations of the present disclosure is shown. The AGV 304-1 includes a frame 352, a storage compartment 357, axles 374 and a plurality of wheels 371 joined to the axles 374. A front surface of the frame 352 includes an imaging device 362-1 having a field of view aligned in a forward direction or orientation with respect to the AGV 304-1 and an array of lights 367. In some implementations, the AGV 304-1 may include any number of imaging devices 362-1, with fields of view that may be permanently or adjustably aligned in any direction or orientation with respect to the AGV 304-1. In some implementations, the AGV 304-1 may include any number of lights, on any surface thereof, and one or more of the lights may include light emitting diodes (LEDs) or other light sources.

A side surface of the frame 352 includes doors 302-1, 302-2 providing access to the storage compartment. In this example, the doors 302-1 and 302-2 are each rotatably connected by a pair of hinges 311-1, 311-2, 311-3, and 311-4. The doors 302-1, 302-2 may include any number of features for causing the opening or closing thereof, and may include any suitable dimensions with respect to the dimensions of the storage compartment 357. In some implementations, the AGV 304-1 may include doors 302 on any surface thereof. In addition, the AGV may have one storage compartment for storing multiple inventory holders or, alternatively, multiple storage compartments, each of the multiple storage compartments for storing one or more inventory holders. The storage compartment(s) 357 may be of any size or shape. The upper surface of the frame 352 further includes a transceiver 356 (e.g., a Wi-Fi transmitter and receiver) for communicating with a network 380, which may include the Internet in whole or in part, as well as a GPS receiver 362, which may receive geolocation data from or transmit geolocation data to a GPS network 385.

As is shown in FIG. 3A, the AGV 304-1 may include a power supply 364 (e.g., a battery, fossil fuel), a motor 370 and a steering component 372 (e.g., one or more racks or pinions for automatically changing a direction of travel of the AGV 304-1 and/or an orientation of one or more of axles 374 or the wheels 371. The motor 370 may be configured to operate at any speed or have any power rating, and to cause the AGV 304-1 to travel in a forward direction of travel, a reverse direction of travel or in any other direction of travel as determined by the steering component 372. Additionally, the axles 374 and wheels 371 of the AGV 304-1 may also have any dimension. For example, the wheels 371 may have bores or axle pads for accommodating axles 374 of any diameter or thickness, and any number of spokes or other extensions for supporting a rim having any desired spacings or offsets for accommodating tires or other coverings. Each of the axles 374 may be joined to and configured to rotate any number of wheels 371, which may include tires or other coverings of any suitable material, including but not limited to rubber. The wheels 371 or tires thereon may feature any number of belts, walls, treads or other components, and may be pneumatic or solid, or take any other form.

In some implementations, the AGV 304-1 may include a lift gate 308 that is rotatable between a closed position, as illustrated in FIG. 3A, and an open position, as illustrated and discussed below with respect to FIGS. 3B and 3C. The lift gate 308 may be on any side or portion of the AGV 304-1 and may be operable to move from a raised position in which the lift gate 308 is approximately parallel with a base of the interior of the storage compartment and a lowered position in which the lift gate is substantially in contact with a surface on which the AGV is traveling. In some implementations, the lift gate may transition between the raised position and the lowered position along one or more rails or tracks 307.

Figure 3B:
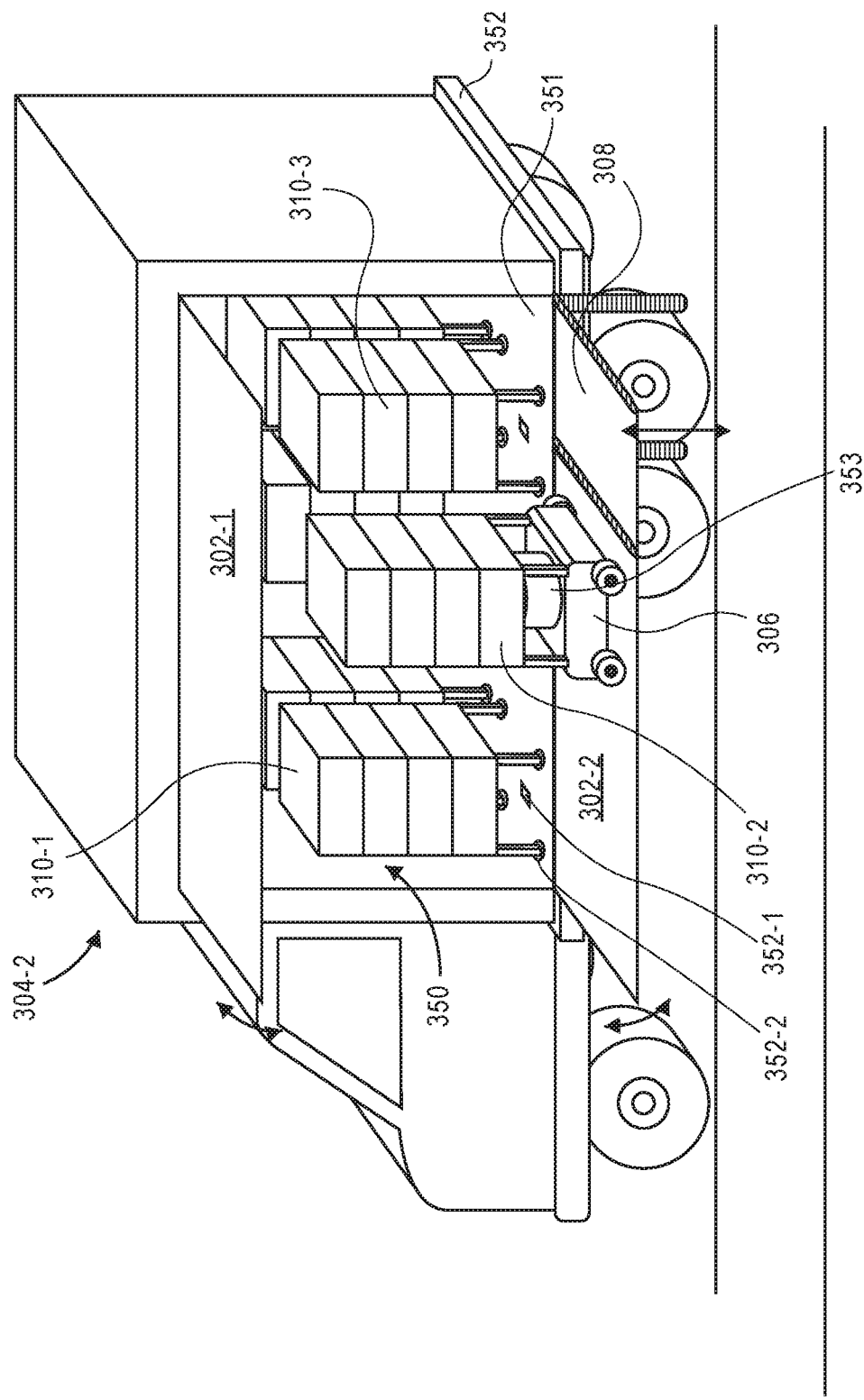

FIG. 3B illustrates an example of the AGV 304-2 in which the doors 302-1 and 302-2 have rotated into an option position, exposing the interior of the storage compartment 350. In this example, when the doors 302 are rotated into the open position, the lower door 302-2 is substantially aligned and parallel with a base surface 351 of the storage compartment 350 and operable to support an ATU 306 and one or more inventory holders 310-2 that are being transported by the ATU 306.

The ATU 306 may ride inside the storage compartment 350 along with the inventory holders 310 as the AGV 304-2 navigates between transfer locations. During transport, the ATU may be operable to reconfigure or reposition inventory holders within the interior of the storage compartment and/or recharge a power supply of the ATU. For example, one or more portions of the base surface 351 of the storage compartment may include charging components 352-1 with which the ATU may receive a charge to replenish a power supply of the ATU. Likewise, the base surface 351 may include one or more charging components 352-2 that may engage with the inventory holders 310 to provide power to and recharge a power supply of the inventory holders during transport of the inventory holders by the AGV.

As discussed further below, the ATU 306 includes a frame having a height that is less than the base of an inventory holder 310 so that the ATU can navigate below the inventory holders and position itself beneath the base of an inventory holder, such as inventory holder 310-2. The ATU may further include a lifting member 353 that may be moved between a retracted position and an extended position. When the lifting member 353 is in the retracted position the ATU is able to navigate beneath the inventory holders 310. When the lifting member 353 is in the extended position, the lifting member 353 engages an underneath of the base surface of an inventory holder 310 and lifts the inventory holder off the surface upon which the inventory holder was resting. When the ATU 306 has lifted the inventory holder, the ATU may navigate under its own power to transition or move the inventory holder 310.

In this example, the ATU 306 has engaged and lifted inventory holder 310-2 and is transferring the inventory holder from the storage compartment of the AGV along the lower door 302-2 and toward the lift gate 308, which in this example is in the raised position and substantially parallel with the position of the lower door 302-2 and the base surface 351 of the interior of the storage compartment 350. As discussed above, the storage compartment may be of a size sufficient to contain multiple inventory holders, such as inventory holders 310-1, 310-2, and 310-3 and may be accessible through doors on any side of the frame 352 of the AGV 304-2.

Figure 3C:
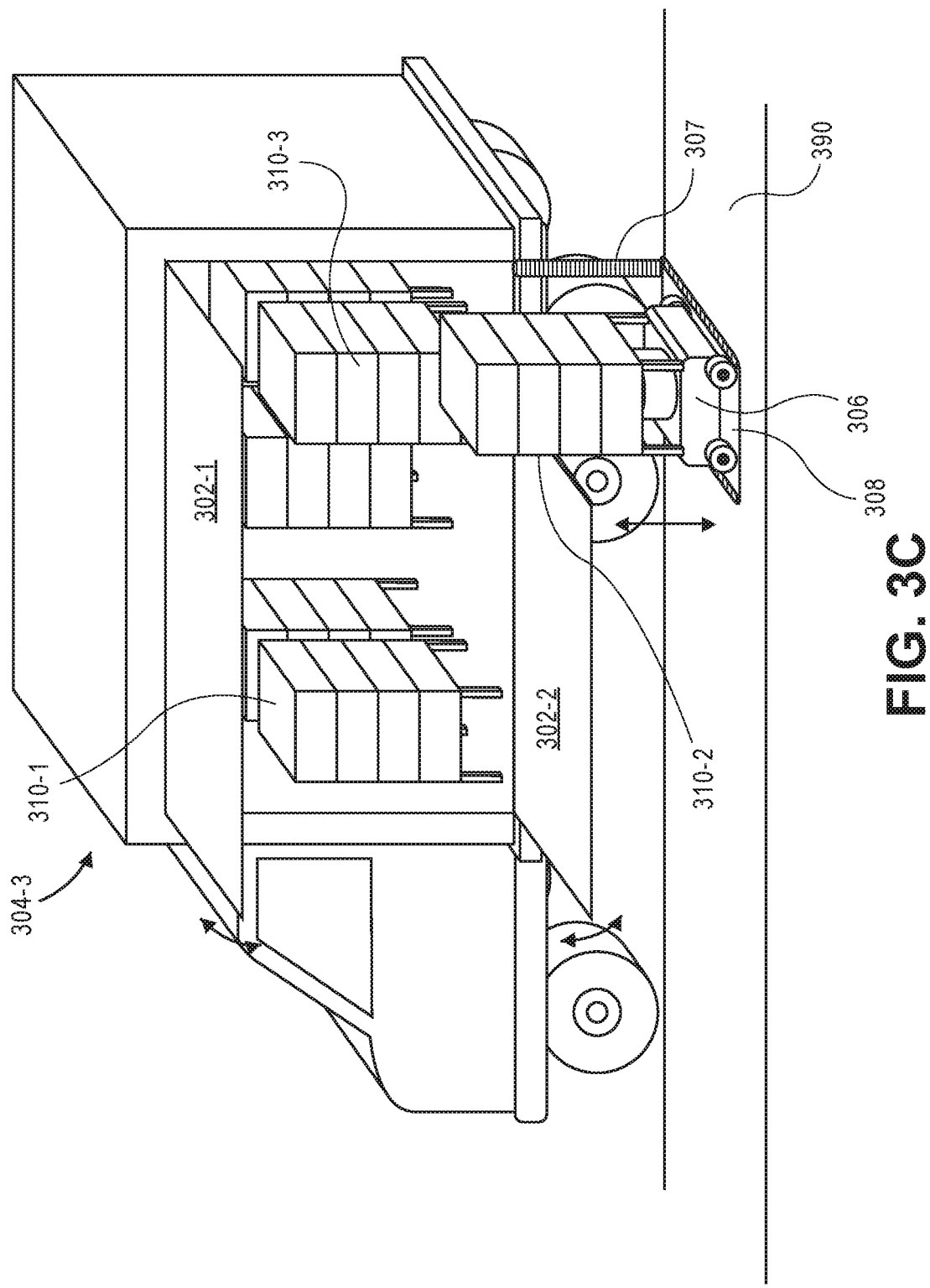

Referring now to FIG. 3C, when the ATU 306, carrying the inventory holder 310-2, is positioned on the lift gate 308, the lift gate may transition between the raised position, illustrated in FIG. 3B, to the lowered position, illustrated in FIG. 3C, in which the lift gate 308 is in contact and substantially aligned with a surface 390 on which the AGV 304-3 is traveling. In some implementations, the lift gate 308 may be moved between the raised position and the lowered position along one or more tracks 307 or rails. The tracks 307 may be of any form, such as chain, gear, or pneumatic tracks and of a sufficient strength to support the ATU and any inventory holder carried by the ATU.

When the lift gate 308 is in the lowered position, the AGV may navigate with the inventory holder 310-2 off the lift gate and separate from the AGV to complete transfer of the inventory holder 310-2 from the AGV 304-2 to the transfer location. As discussed further below, the ATU may include navigation components that enable autonomous navigation of the ATU when separated from the AGV 304-3. Likewise, in addition to or as an alternative to transitioning an inventory holder from the AGV to a transfer location, the ATU may retrieve an inventory holder from a transfer location, navigate with the inventory holder onto the lift gate 308, the lift gate may move from the lowered position to the raised position, and the ATU 306 may stow the inventory holder in the storage compartment of the AGV 304-3.

Like the AGVs, the ATUs of the present disclosure may be vehicles having any number of wheels mounted to axles that may be rotated by one or more motors, with dimensions, masses or other indicators of size that may be selected on any basis. For example, in some implementations, such ATUs may be sized and configured to travel on sidewalks, in parking lots, along grass or dirt surfaces of varying terrain and at various speeds, e.g., in response to one or more computer-based instructions.

Additionally, ATUs of the present disclosure may include a lifting member that may be used to engage and lift one or more inventory holders so that the ATU can transport the inventory holder between locations, such as from an interior of a storage compartment of an AGV to a position at a transfer location. Such lifting members may be positionable at various angles to aid in transport of the inventory holders so that the inventory holders remain substantially vertical and upright during transport, even if the ATU is navigating along an uneven surface. Furthermore, in some implementations, the ATU may include various equipment or components for determining or identifying different inventory holders. For example, the ATU may include a scanner or RFID reader that is able to detect a fiducial on the inventory holder, such as on the underneath of the base surface of the inventory holder and/or an RFID signal transmitted from an RFID tag on the inventory holder.

Moreover, the ATUs of the present disclosure may include any number of sensors such as position sensors (e.g., GPS, receivers), imaging sensors (e.g., digital cameras or other imaging devices) or other sensors, including but not limited to speedometers, inclinometers, compasses, altimeters, gyroscopes or scanners. The ATUs of the present disclosure may also include communications equipment (e.g., wired or wireless means for communication such as components or systems operating Wireless Fidelity, or Wi-Fi, Bluetooth, near-field communications or cellular technologies or protocols), along with one or more power supplies (e.g., batteries, fossil fuel, solar power), which may be rechargeable, refuellable or replaceable in nature. Information or data obtained or determined by such sensors or such communications equipment may be utilized in autonomously controlling the ATU, e.g., in causing the ATU to navigate between an AGV and a position at a transfer location. The ATUs of the present disclosure may further include any number of computer components (e.g., processors, data stores, transceivers or input/output devices) for performing any of the functions or accomplishing any of the missions or tasks described herein.

Figure 4A:
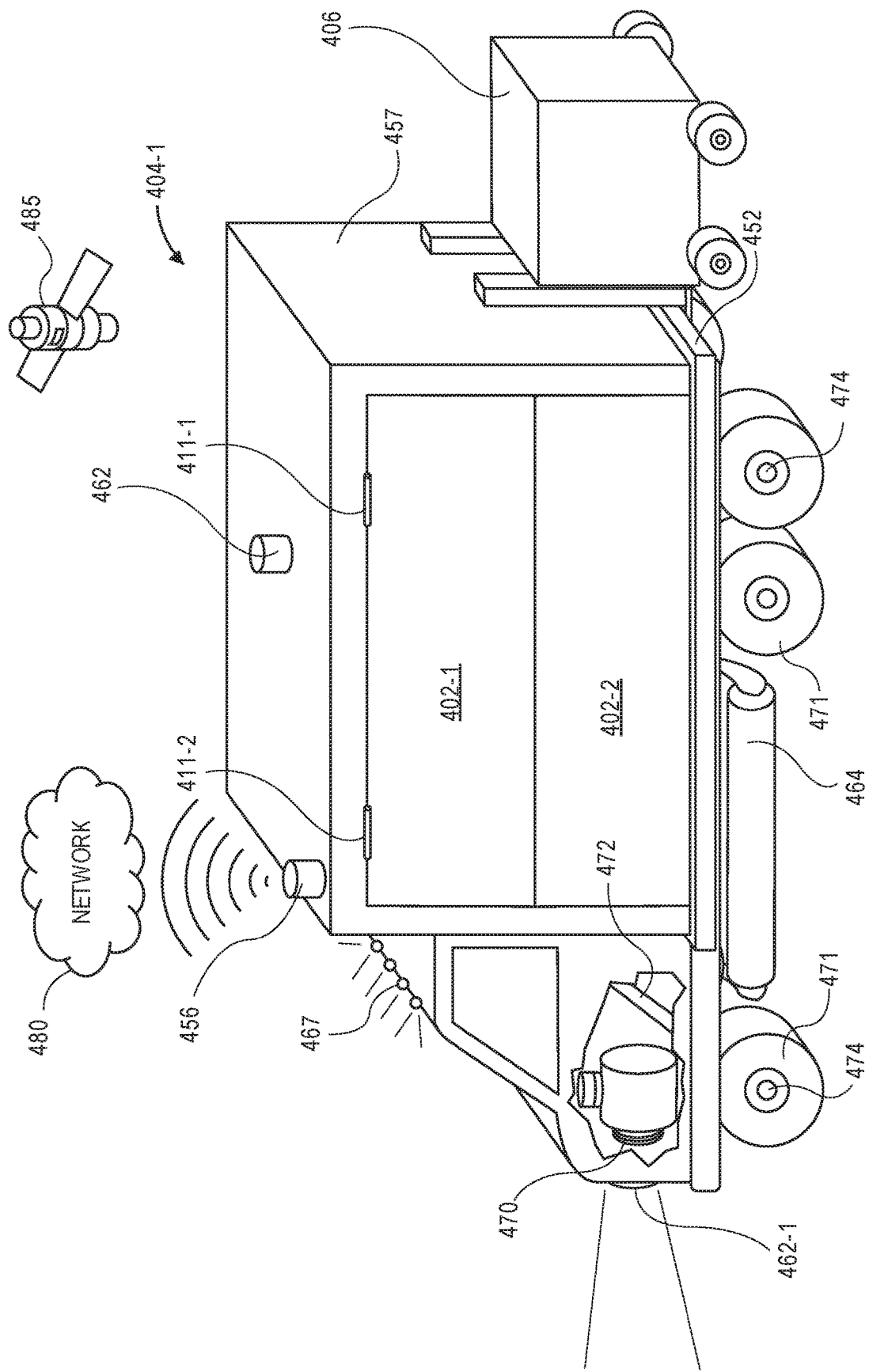
FIGS. 4A-4C illustrate another example autonomous ground vehicle, in accordance with implementations of the present disclosure.

FIG. 4A is another illustration of an AGV 404-1 in accordance with implementations of the present disclosure. The AGV 404-1 includes a frame 452, a storage compartment 450, axles 474 and a plurality of wheels 471 joined to the axles 474. A front surface of the frame 452 includes an imaging device 462-1 having a field of view aligned in a forward direction or orientation with respect to the AGV 404-1 and an array of lights 467. In some implementations, the AGV 404-1 may include any number of imaging devices 462-1, with fields of view that may be permanently or adjustably aligned in any direction or orientation with respect to the AGV 404-1. In some implementations, the AGV 404-1 may include any number of lights, on any surface thereof, and one or more of the lights may include light emitting diodes (LEDs) or other light sources.

A side surface of the frame 452 includes doors 402-1, 402-2 providing access to the storage compartment. In this example, the doors 402-1 and 402-2 are connected at a middle hinge and rotate upward about a pair of hinges 411-1 and 411-2. The doors 402-1, 402-2 may include any number of features for causing the opening or closing thereof, and may include any suitable dimensions with respect to the dimensions of the storage compartment 450. In some implementations, the AGV 404-1 may include doors 402 on any surface thereof. In addition, the AGV may have one storage compartment for storing multiple inventory holders or, alternatively, multiple storage compartments, each of the multiple storage compartments for storing one or more inventory holders. The storage compartment(s) 450 may be of any size or shape. The upper surface of the frame 452 further includes a transceiver 456 (e.g., a Wi-Fi transmitter and receiver) for communicating with a network 480, which may include the Internet in whole or in part, as well as a GPS receiver 462, which may receive geolocation data from or transmit geolocation data to a GPS network 485.

Like the AGV 304 discussed with respect to FIGS. 3A-3C, the AGV 404-1 may include a power supply 464, a motor 470 and a steering component 472. In this example, mounted to the rear of the AGV is an ATU 406. In comparison to the ATU 306 discussed with respect to FIGS. 3A-3C, the ATU 406 may not enter or ride within the storage compartment 450 but, instead, may be operable to mount and dismount from the frame 452 of the AGV 404-1 so that the ATU 406 can access and remove inventory holders from the interior of the storage compartment 450 of the AGV 404.

Figure 4B:
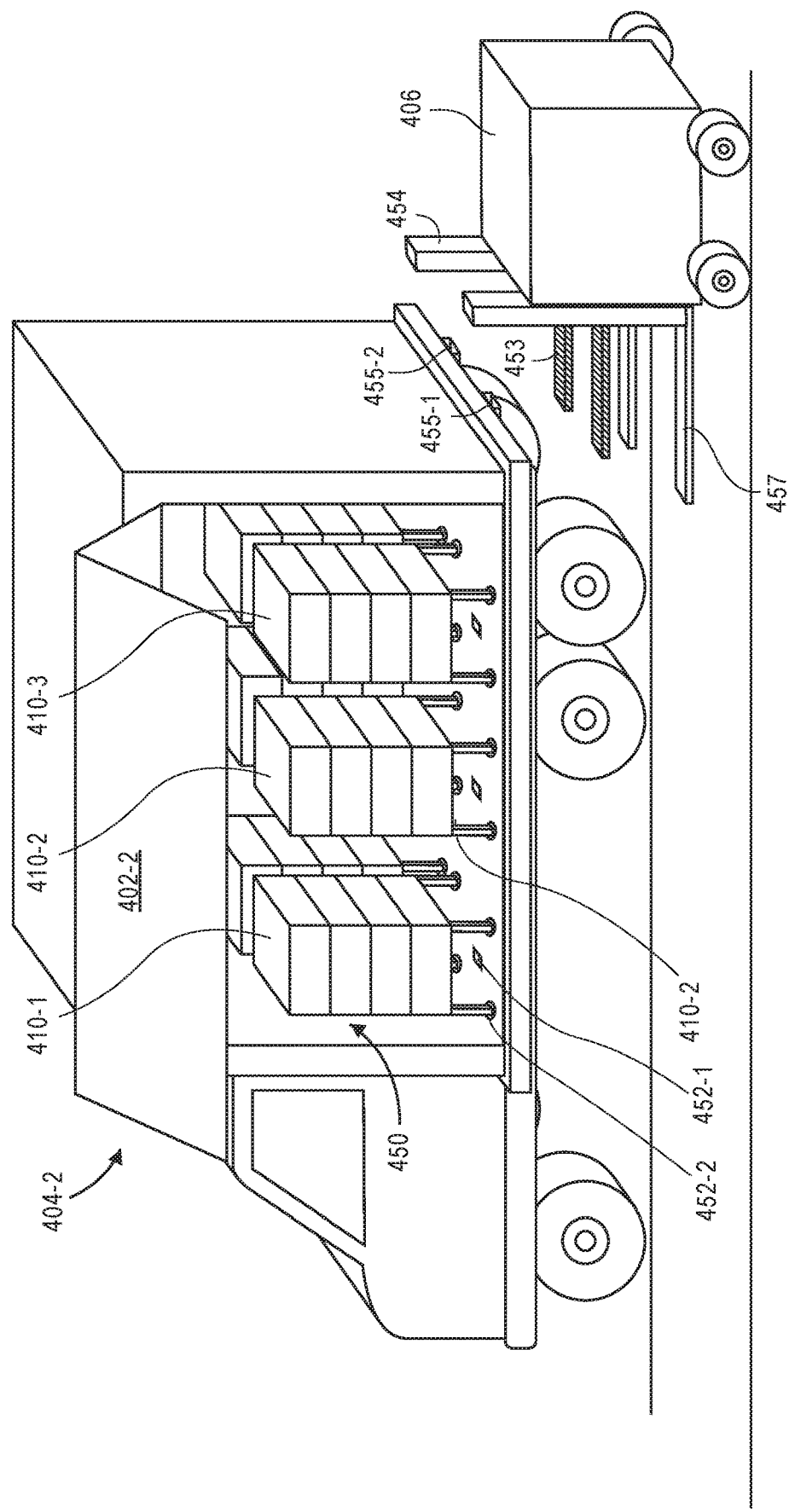

For example, as illustrated in FIG. 4B, the ATU 406 has decoupled from the AGV 404-2 and is autonomously moving toward the open side of the storage compartment 450 so that the ATU can remove an inventory holder, such as one of inventory holders 410-1, 410-2, or 410-3 from the storage compartment 450 and transfer the inventory holder to the transfer location. In addition, in this example, when the doors 402 are rotated into the open position, the lower door 402-2 is rotated upward with the upper portion of the door to enable access by the ATU to the inventory holders within the storage compartment 450.

Referring to the rear of the AGV, pockets 455-1 and 455-2 may be included along the perimeter of the frame of the AGV. When the ATU 406 couples to the AGV for transport, the ATU may position the lifting members 453 into the pockets 455 and use the lifting arms 454 to lift the AGV off the surface so that it is coupled with the AGV and transportable by the AGV. When lifted, the stabilizer arms 457 may be used to secure the ATU in the lifted position to the rear of the AGV.

In this example, the ATU 406 may engage an inventory holder 410 by positioning the lifting members 453 of the AGV under a base of the inventory holder and lifting the inventory holder may moving the lifting members 453 vertically along the lifting arm 454. In some implementations, the ATU 406 may also include stabilizer arms 457 that are positioned toward the surface to balance and stabilize the ATU 406 when lifting an inventory holder. In other implementations, the body of the ATU 406 may act as a counterbalance to stabilize the ATU 406 when transporting an inventory holder 410.

Figure 4C:
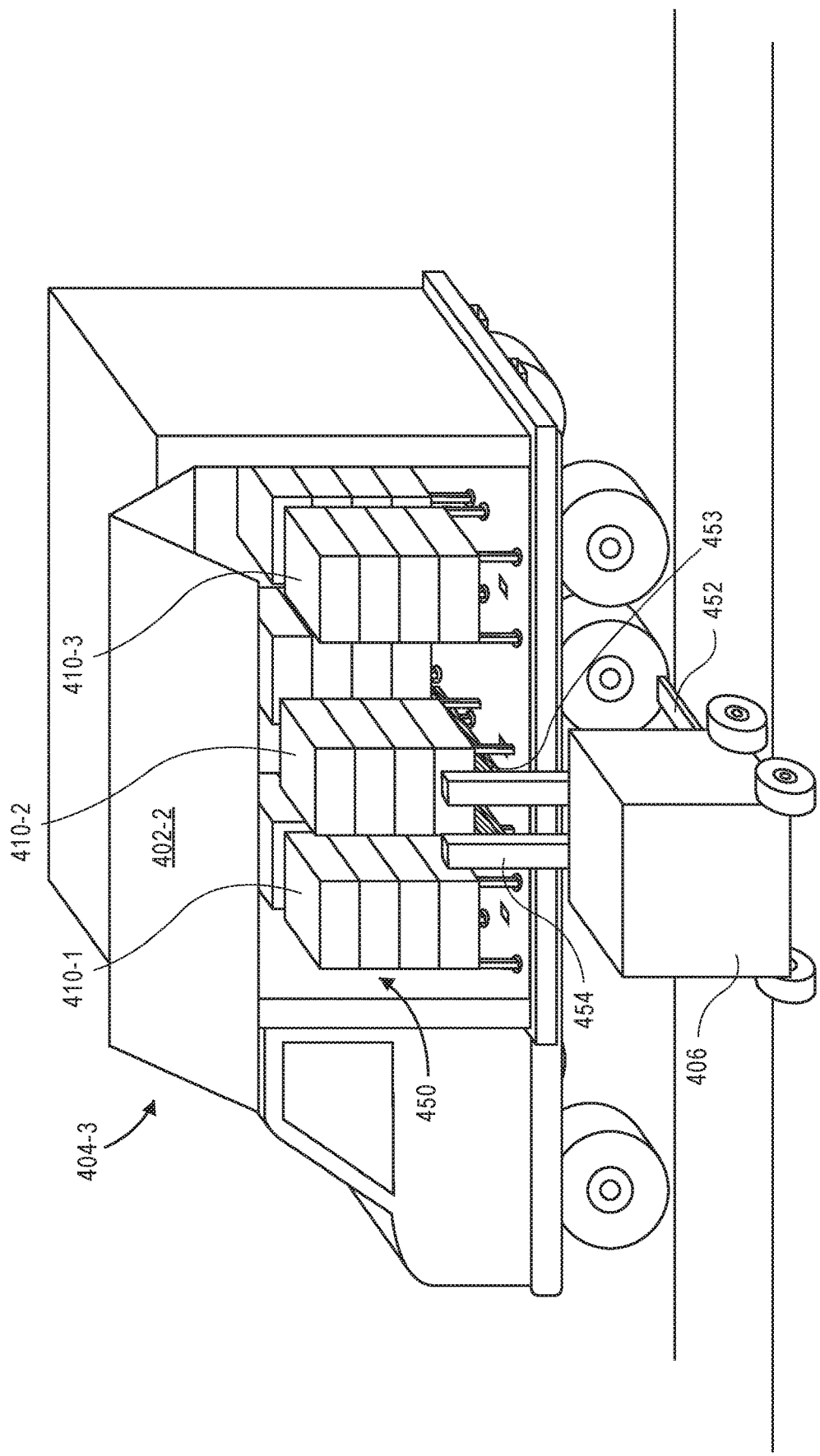

Referring now to FIG. 4C, in this example, the ATU 406 has engaged inventory holder 410-2 with the lifting members 453 and is removing the inventory holder 410-2 from the interior of the storage compartment 450 to transfer the inventory holder 410-2 to a position at a transfer location at which the AGV is positioned. By using the lifting members 453 that are vertically positionable along the lifting arms 454, the ATU can retrieve inventory holders from the interior of the AGV 404-3 and lower the inventory holder 410 down to a surface on which the ATU and AGV are operating and leave the inventory holder at the transfer location. Likewise, the ATU 406 can retrieve an inventory holder from the surface of a transfer location, lift the inventory holder with the lifting members 453 and place the inventory holder into the storage compartment 450 of the AGV.

Figure 5:
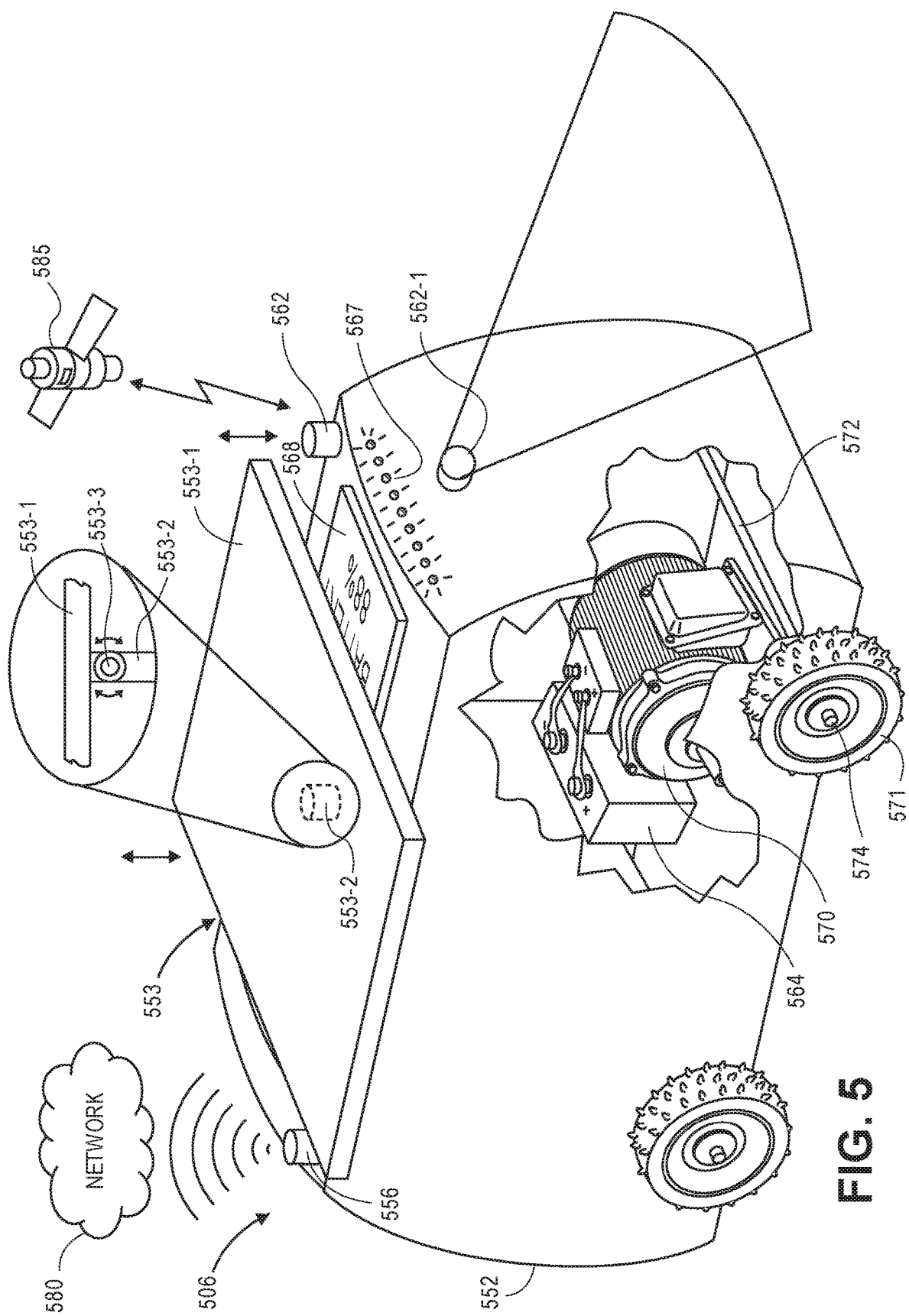
FIG. 5 illustrates an autonomous transition unit that may be used to autonomously transfer an inventory holder between an autonomous ground vehicle and a transfer location, in accordance with implementations of the present disclosure.

Referring to FIG. 5, a view of one ATU 506 in accordance with implementations of the present disclosure is shown. The ATU 506 includes a frame 552, axles 574, and a plurality of wheels 571 joined to the axles 574. A front surface of the frame 552 includes an imaging device 562-1 having a field of view aligned in a forward direction or orientation with respect to the ATU 506 and an array of lights 567. In some implementations, the ATU 506 may include any number of imaging devices 562-1, with fields of view that may be permanently or adjustably aligned in any direction or orientation with respect to the ATU 506. In some implementations, the ATU 506 may include any number of lights, on any surface thereof, and one or more of the lights may include light emitting diodes (LEDs) or other light sources.

An upper surface of the frame 552 includes a lifting member 553 that may move between a retracted position and an extended position and is operable to engage and lift an inventory holder when the ATU is positioned beneath the inventory holder. The lifting member 553 may include a plate 553-1 or other substantially flat surface that is operable to engage with an underneath surface of an inventory holder. The plate 553-1 may be extended or retracted by an arm 553-2. The arm of the lifting member 553 may a worm drive, mechanical drive, pneumatic drive, hydraulic drive, etc., that moves the plate between a retracted positioned in which the plate 553-1 is retracted toward the ATU 506 and an extended position in which the plate 553-1 is extended away from the frame of the ATU 506.

In some implementations, as illustrated in the expanded view, the lifting member 553 may include a ball or articulation point 553-3 between the arm 553-2 and the plate 553-1 to allow rotation or alignment of the plate when the arm is in the extended position. For example, if the ATU is carrying an inventory holder and the ATU is navigating on an uneven surface, the articulation point 553-3 may rotate so that the plate remains substantially horizontal and, as a result, the carried inventory holder remains substantially upright and vertical. In some implementations, the ATU may obtain information from an accelerometer of the ATU and adjust the articulation point 553-3 based on the accelerometer information.

The upper surface of the frame 552 of the ATU 506 further includes a transceiver 556 (e.g., a Wi-Fi transmitter and receiver) for communicating with a network 580, which may include the Internet in whole or in part, as well as a GPS receiver 562, which may receive geolocation data from or transmit geolocation data to a GPS network 585. The upper surface of the frame 552 may further include a user interface 568 which may receive interactions from a human user, or display information to the human user, as appropriate. In some implementations, the GPS receiver 562, the transceiver 556 and/or the user interface 568 may be provided on any other surface of the frame 552.

As is shown in FIG. 5, the ATU 506 may include a power module 564 (e.g., a battery), a motor 570 (e.g., a DC electric motor operating at twelve to forty-eight volts) and a steering component 572 (e.g., one or more racks or pinions) for automatically changing a direction of travel of the ATU 506 and/or an orientation of one or more of axles 574 or the wheels 571. The motor 570 may be configured to operate at any speed or have any power rating, and to cause the ATU 506 to travel in a forward direction of travel, a reverse direction of travel or in any other direction of travel as determined by the steering component 572. Additionally, the axles 574 and wheels 571 of the ATU 506 may also have any dimension. For example, the wheels 571 may have bores or axle pads for accommodating axles 574 of any diameter or thickness, and any number of spokes or other extensions for supporting a rim having any desired spacings or offsets for accommodating tires or other coverings. Each of the axles 574 may be joined to and configured to rotate any number of wheels 571, which may include tires or other coverings of any suitable material, including but not limited to rubbers and/or plastics. The wheels 571 or tires thereon may feature any number of belts, walls, treads or other components, and may be pneumatic or solid, or take any other form.

Figure 6:
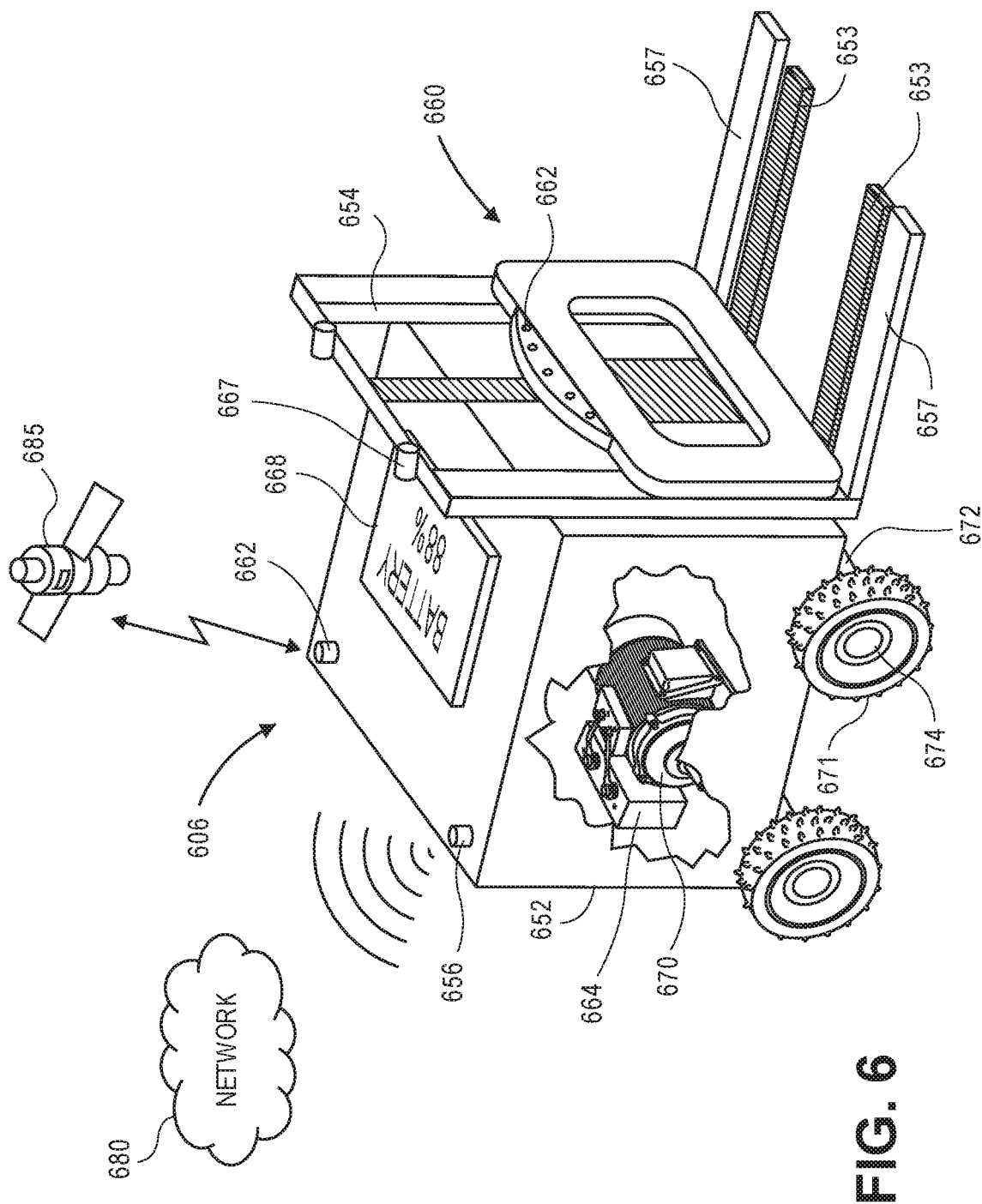
FIG. 6 illustrates another autonomous transition unit that may be used to autonomously transfer an inventory holder between an autonomous ground vehicle and a transfer location, in accordance with implementations of the present disclosure.

Referring to FIG. 6, illustrated is another view of an ATU 606, in accordance with implementations of the present disclosure is shown. The ATU 606 corresponds to the ATU discussed above with respect to FIGS. 4A-4C. As illustrated, the ATU 606 includes a frame 652, axles 674, and a plurality of wheels 671 joined to the axles 674. Mounted to the front of the ATU 606 is a lifting frame 660 that includes lifting members 653, lifting arms 654, and stabilizers 657. In this example, positioned along the front of the lifting frame 660 are a plurality of imaging device 662 having a field of view aligned in a forward direction or orientation with respect to the ATU 606. An array of lights 667 is also coupled to the lifting frame 660. In some implementations, the ATU 606 and/or lifting frame of the ATU may include any number of imaging devices 662-1, with fields of view that may be permanently or adjustably aligned in any direction or orientation with respect to the ATU 606. In some implementations, the ATU 606 may include any number of lights, on any surface thereof, and one or more of the lights may include light emitting diodes (LEDs) or other light sources.

As discussed above, the lifting members 653 may move vertically along the lifting arms 654 so that the lifting members may be positioned beneath and lift inventory holders. The lifting frame may use or include any form of lifting mechanism, such as hydraulics, chain drive, worm drive, mechanical drive, pneumatic drive, etc., to lift the lifting members 653.

The upper surface of the frame 652 of the ATU 606 further includes a transceiver 656 (e.g., a Wi-Fi transmitter and receiver) for communicating with a network 680, which may include the Internet in whole or in part, as well as a GPS receiver 662, which may receive geolocation data from or transmit geolocation data to a GPS network 685. The upper surface of the frame 652 may further include a user interface 668 which may receive interactions from a human user, or display information to the human user, as appropriate. In some implementations, the GPS receiver 662, the transceiver 656 and/or the user interface 668 may be provided on any other surface of the frame 652.

Similar to the ATU 506 discussed above with respect to FIG. 5, and as is shown in FIG. 6, the ATU 606 may include a power module 664, a motor 670, and a steering component 672. As described, the AGVs and ATUs enable autonomous delivery and retrieval of inventory holders to and from various transfer locations. While the illustrated examples discussed with respect to FIGS. 3A-3C, FIGS. 4A-4C, FIG. 5, and FIG. 6 describe the ATU as an autonomous unit that is separable from the AGV 304, in other implementations, the ATU may be coupled with and controlled by the AGV. For example, in some implementations, the ATU may be a robotic arm coupled to the AGV that is operable to engage an inventory holder positioned within the interior of the storage compartment and transition the inventory holder from the storage compartment of the AGV and place the inventory holder at a transfer location. Likewise, the ATU, in the form of a robotic arm coupled to the AGV, may be operable to engage an inventory holder positioned at a transfer location and transfer the inventory holder from the transfer location into the storage compartment of the AGV.

Figure 7A:
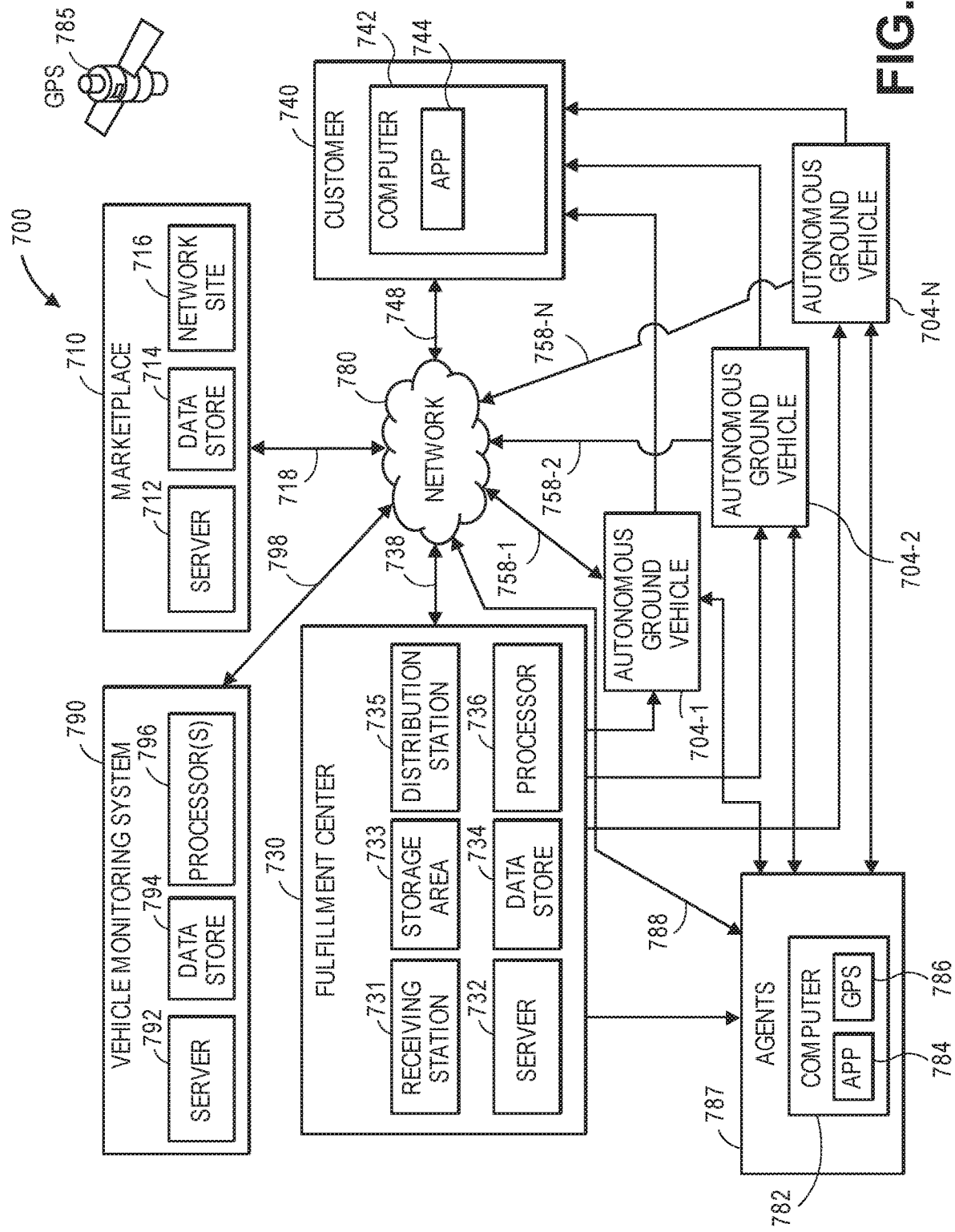
FIGS. 7A and 7B illustrate block diagram components of one system including an autonomous ground vehicle, in accordance with implementations of the present disclosure.
Figure 7B:
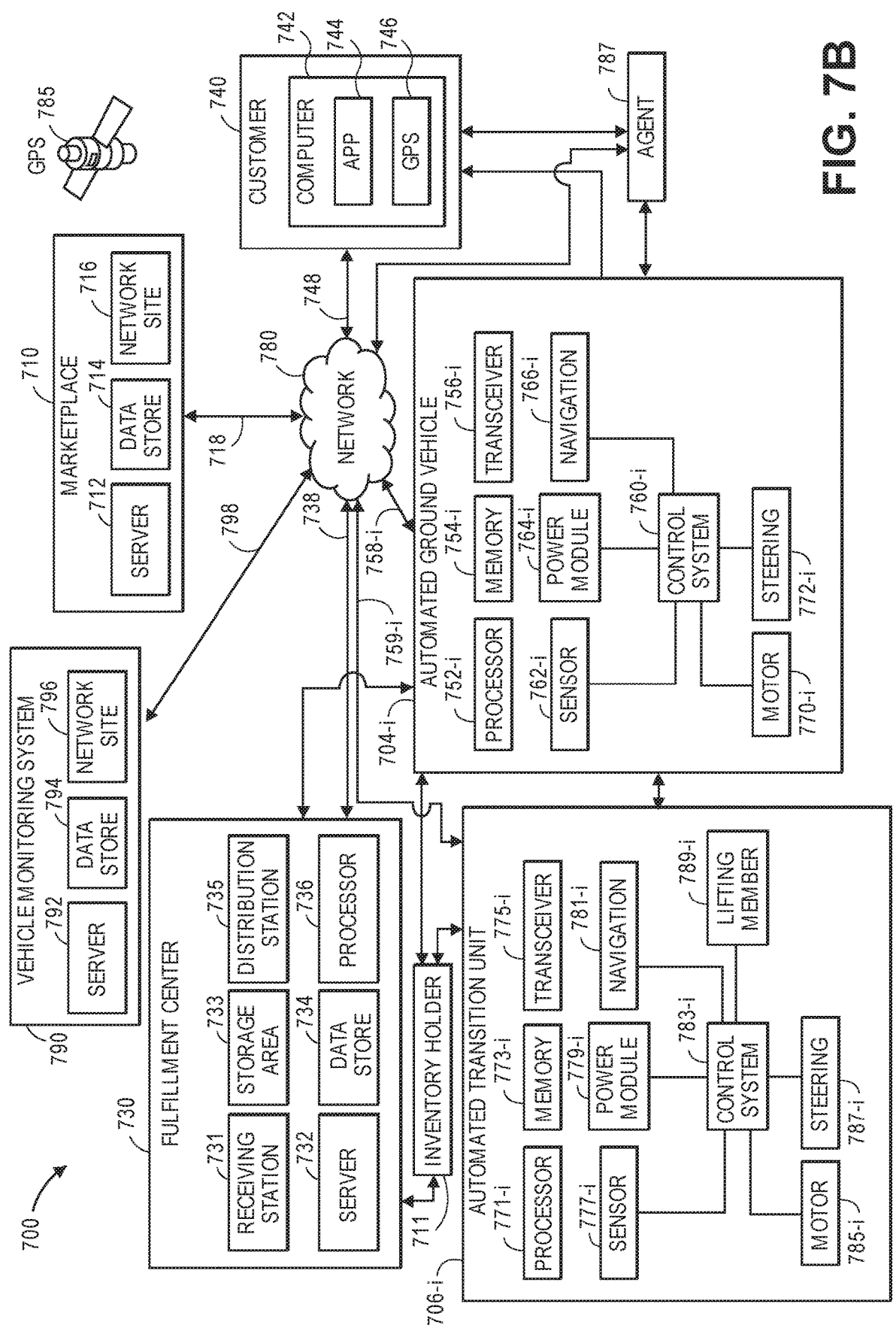

Referring to FIGS. 7A and 7B, a block diagram of components of one system 700 in accordance with implementations of the present disclosure is shown. The system 700 includes a marketplace 710, a fulfillment center 730, a customer 740, a plurality of AGVs 704-1, 704-2 . . . 704-n, a plurality of agents 787, and a vehicle monitoring system 790 that are connected to one another across a communications network 780, which may include the Internet in whole or in part.

The marketplace 710 may be any entity or individual that wishes to make items from a variety of sources (e.g., vendors, manufacturers, merchants or sellers) available for download, purchase, rent, lease or borrowing by customers using a networked computer infrastructure, including one or more physical computer servers 712 and data stores 714 (e.g., databases) for hosting a network site 716, such as an electronic commerce website. The marketplace 710 may be physically or virtually associated with one or more storage or distribution facilities, such as the fulfillment center 730. The network site 716 may be implemented using the one or more servers 712, which connect or otherwise communicate with the one or more data stores 714 as well as the communications network 780, as indicated by line 718, through the sending and receiving of digital data. Moreover, the data store 714 may include any type of information regarding items that have been made available for sale through the marketplace 710, or ordered by customers, such as the customer 740, from the marketplace 710, or any information or data regarding the delivery of such items to the customers, e.g., by one or more of the agents 787 who may retrieve the item from an inventory holder delivered to a transfer location by one or more of the AGVs 704.

The fulfillment center 730 may be any facility that is adapted to receive, store, process and/or distribute items. As is shown in FIG. 7A, the fulfillment center 730 includes a server 732, a data store 734, and one or more computer processors 736. The fulfillment center 730 also includes stations for receiving, storing and distributing items to customers, including but not limited to a receiving station 731, a storage area 733 and a distribution station 735.

The server 732 and/or the processors 736 may operate one or more order processing and/or communication systems and/or software applications having one or more user interfaces, or communicate with one or more other computing devices or machines that may be connected to the communications network 780, as indicated by line 738, to transmit or receive information in the form of digital or analog data, or for any other purpose. For example, the server 732 and/or the processors 736 may also operate or provide access to one or more reporting systems for receiving or displaying information or data regarding orders for items received by the marketplace 710, inventory holders carried by one or more AGVs 704-1, 704-2 . . . 704-n, inventory holders available for retrieval, etc., and may provide one or more interfaces for receiving interactions (e.g., text, numeric entries or selections) from one or more operators, users, workers or other persons in response to such information or data. The server 732, the data store 734 and/or the processor 736 may be a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users, workers or persons.

The receiving station 731 may include any apparatuses that may be required in order to receive shipments of items at the fulfillment center 730 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The storage area 733 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 735 may include one or more regions or stations where items that have been retrieved from a designated storage area may be evaluated, prepared and placed on inventory holders and/or packed into containers for delivery from the fulfillment center 730 to addresses, locations or other delivery destinations specified by customers. For example, ordered items may be loaded onto inventory holders that are transported from the fulfillment center by AGVs 704 to various transfer locations. The items may then be retrieved from the inventory holder by agents 787 and delivered by the agents 787 to delivery destinations. The distribution station may also be capable of preparing and shipping items from the fulfillment center using other means, including but not limited to, carriers such as cars, trucks, trailers, freight cars, container ships or cargo aircraft (e.g., manned aircraft or unmanned aircraft, such as drones). Those of ordinary skill in the pertinent art will recognize that shipments of items arriving at the receiving station 731 may be processed, and the items placed into storage within the storage areas 733 or, alternatively, transferred directly to the distribution station 735, or "cross-docked," for prompt delivery to one or more customers.

The fulfillment center 730 may further include one or more control systems that may generate instructions for conducting operations at one or more of the receiving station 731, the storage area 733 or the distribution station 735. Such control systems may be associated with the server 732, the data store 734 and/or the processor 736, or with one or more other computing devices or machines, and may communicate with the receiving station 731, the storage area 733 or the distribution station 735 within the fulfillment center 730 by any known wired or wireless means, or with the marketplace 710, the customer 740 or one or more of the AGVs 704-1, 704-2 . . . 704-n over the communications network 780, as indicated by line 738, through the sending and receiving of digital data.

Additionally, the fulfillment center 730 may include one or more systems or devices for determining locations of one or more elements therein, such as cameras or other image recording devices. Furthermore, the fulfillment center 730 may also include one or more workers or staff members, who may handle or transport items within the fulfillment center 730. Such workers may operate one or more computing devices or machines for registering the receipt, retrieval, transportation or storage of items within the fulfillment center, or a general-purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The customer 740 may be any entity or individual that wishes to download, purchase, rent, lease, borrow or otherwise obtain items (which may include goods, products, services or information of any type or form) from the marketplace 710. The customer 740 may utilize one or more computing devices 742 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 744, such as a web browser or a shopping application, and may be connected to or otherwise communicate with the marketplace 710, the fulfillment center 730, the AGVs 704-1, 704-2 . . . 704-n, or the agents 787 through the communications network 780, as indicated by line 748, by the transmission and receipt of digital data.

The AGVs 704-1, 704-2 . . . 704-n may be any type or form of self-powered autonomous vehicle capable of being programmed or otherwise configured for autonomous travel between two or more transfer locations, in furtherance of the performance of one or more missions or tasks, such as the delivery of an inventory holder from the fulfillment center 730 to a transfer location and/or the retrieval of an inventory holder from a transfer location. Each of the AGVs 704-1, 704-2 . . . 704-n shown in FIG. 7A, which are represented in FIG. 7B as an AGV 704-$i$, may include one or more computer components such as a processor 752-$i$, a memory 754-$i$ and a transceiver 756-$i$ in communication with one or more other computer devices that may be connected to the communications network 780, as indicated by line 758-$i$, in order to transmit or receive information in the form of digital or analog data, or for any other purpose. For example, the AGV 704-$i$ may receive instructions or other information or data via the transceiver 756-$i$ regarding an inventory holder that is to be delivered from the fulfillment center 730 to a transfer location from the marketplace server 712, the fulfillment center server 732 and/or the customer computing device 742, or from any other computing device over the communications network 780. The transceiver 756-$i$ may be configured to enable the AGV 704-$i$ to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the communications network 780 or directly.

The transceiver 756-$i$ may further include or be in communication with one or more input/output (or "I/O") interfaces, network interfaces and/or input/output devices, and may be configured to allow information or data to be exchanged between one or more of the components of the AGV 704-$i$, or to one or more other computer devices or systems (e.g., other AGVs and/or an ATU) via the communications network 780 or via direct communication. For example, in some implementations, the transceiver 756-$i$ may be configured to coordinate I/O traffic between the processor 752-$i$ and one or more onboard or external computer devices or components. The transceiver 756-$i$ may perform any necessary protocol, timing or other data transformations in order to convert data signals from a first format suitable for use by one component into a second format suitable for use by another component. In some implementations, the transceiver 756-$i$ may include support for devices attached through various types of peripheral buses, e.g., variants of the Peripheral Component Interconnect (PCI) bus standard or the Universal Serial Bus (USB) standard. In some other implementations, functions of the transceiver 756-$i$ may be split into two or more separate components, or incorporated directly into the processor 752-$i$.

As is also shown in FIG. 7B, the AGV 704-$i$ further includes one or more control systems 760-$i$, as well as one or more sensors 762-$i$, one or more power modules 764-$i$, one or more navigation modules 766-$i$, and one or more user interfaces 768-$i$. Additionally, the AGV 704-$i$ further includes one or more motors 770-$i$, and one or more steering systems 772-$i$.

The control system 760-$i$ may include one or more software applications or hardware components configured for controlling or monitoring operations of one or more components such as the sensor 762-$i$, the power module 764-$i$, the navigation module 766-$i$, or the user interfaces 768-*i*, as well as the motors 770-*i*, and the steering systems 772-*i*, by receiving, generating, storing and/or transmitting one or more computer instructions to such components. The control system 760-*i* may communicate with the marketplace 710, the fulfillment center 730, agents 787, inventory holders 711, and/or ATUs 706-*i* over the communications network 780, as indicated by line 758-*i*, through the sending and receiving of digital data.

The sensor 762-*i* may be a position sensor such as a GPS receiver in communication with one or more orbiting satellites or other components of a GPS system 785, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or GIS data), of the AGV 704-*i*. Geolocations of the sensor 762-*i* may be associated with the AGV 704-*i*, where appropriate.

The sensor 762-*i* may also be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the AGV 704-*i*, or for any other purpose. For example, the sensor 762-*i* may be configured to capture or detect reflected light if the reflected light is within a field of view of the sensor 762-*i*, which is defined as a function of a distance between an imaging sensor and a lens within the sensor 762-*i*, viz., a focal length, as well as a location of the sensor 762-*i* and an angular orientation of the lens. Accordingly, where an object appears within a depth of field, or a distance within the field of view where the clarity and focus is sufficiently sharp, the sensor 762-*i* may capture light that is reflected off objects of any kind to a sufficiently high degree of resolution using one or more sensors thereof, and store information regarding the reflected light in one or more data files.

The sensor 762-*i* may also include manual or automatic features for modifying a field of view or orientation. For example, the sensor 762-*i* may be a digital camera configured in a fixed position, or with a fixed focal length (e.g., fixed-focus lenses) or angular orientation. Alternatively, the sensor 762-*i* may include one or more actuated or motorized features for adjusting a position of the sensor 762-*i*, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 762-*i*, or a change in one or more of the angles defining the angular orientation of the sensor 762-*i*.

For example, the sensor 762-*i* may be an imaging device that is hard-mounted to a support or mounting that maintains the imaging device in a fixed configuration or angle with respect to one, two or three axes. Alternatively, however, the sensor 762-*i* may be provided with one or more motors and/or controllers for manually or automatically operating one or more of the components, or for reorienting the axis or direction of the sensor 762-*i*, i.e., by panning or tilting the sensor 762-*i*. Panning the sensor 762-*i* may cause a rotation within a horizontal plane or about a vertical axis (e.g., a yaw), while tilting the sensor 762-*i* may cause a rotation within a vertical plane or about a horizontal axis (e.g., a pitch). Additionally, the sensor 762-*i* may be rolled, or rotated about its axis of rotation, and within a plane that is perpendicular to the axis of rotation and substantially parallel to a field of view of the sensor 762-*i*.

Imaging data (e.g., still or moving images, as well as associated audio data or metadata) captured using the sensor 762-*i* may be processed according to any number of recognition techniques. In some implementations, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensor 762-*i* may further be one or more compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), accelerometers, ranging sensors (e.g., radar or LIDAR ranging sensors) or sound sensors (e.g., microphones, piezoelectric sensors, vibration sensors or other transducers for detecting and recording acoustic energy from one or more directions).

The sensor 762-*i* may also be an item identification sensor and may include a bar code scanner, RFID reader, or other technology that is utilized to determine an identification of an inventory holder that is being retrieved or deposited, or has been retrieved or deposited, by the AGV 704-*i* and/or the corresponding ATU 706-*i*. In some implementations, the sensor 762-*i* may be provided within a storage component of the AGV 704-*i*, such as a presence detection sensor and/or a motion sensor for detecting the presence or absence of one or more inventory holders 711 within the storage compartment.

The sensor 762-*i* may be further configured to capture, record and/or analyze information or data regarding its positions, velocities, accelerations or orientations of the AGV 704-*i*, and to analyze such data or information by one or more means, e.g., by aggregating or summing such data or information to form one or more qualitative or quantitative metrics of the movement of the sensor 762-*i*. For example, a net vector indicative of any and all relevant movements of the AGV 704-*i*, including but not limited to physical positions, velocities, accelerations or orientations of the sensor 762-*i*, may be derived. Additionally, coefficients or scalars indicative of the relative movements of the AGV 704-*i* may also be defined.

The power module 764-*i* may be any type of power source for providing electrical power, mechanical power or other forms of power in support of one or more electrical or mechanical loads aboard the AGV 704-*i*. In some implementations, the power module 764-*i* may include one or more batteries or other power cells, e.g., dry cell or wet cell batteries such as lead-acid batteries, lithium ion batteries, nickel cadmium batteries or nickel metal hydride batteries, or any other type, size or form of batteries. The power module 764-*i* may each have any cell voltages, peak load currents, charge times, specific energies, internal resistances or cycle lives, or other power ratings. The power module 764-*i* may also be any type, size or form of other power source, e.g., other than a battery, including but not limited to or more fuel cells, turbines, solar cells or nuclear reactors. Alternatively, the power module 764-*i* may be another form of prime mover (e.g., electric, gasoline-powered or any other type of motor) capable of generating sufficient mechanical forces for the AGV 704-*i*.

The navigation module 766-*i* may include one or more software applications or hardware components including or having access to information or data regarding aspects of a navigable path network, including the locations, dimensions, capacities, conditions, statuses or other attributes of the various paths of a navigable path network. For example, the navigation module 766-*i* may receive inputs from the sensor 762-*i*, e.g., from a GPS receiver, an imaging device or another sensor, and determine an optimal direction and/or an optimal speed of the AGV 704-*i* for travelling on a given path based on such inputs. The navigation module 766-*i* may determine a path to be traveled by the AGV 704-*i*, and may provide information or data regarding the determined path to the control system 760-*i*.

The motor 770-*i* may be any type or form of motor or engine (e.g., electric, gasoline-powered or any other type of motor) that is capable of providing sufficient rotational forces to one or more axles, shafts and/or wheels for causing the AGV 704-*i* and any items therein to travel in a desired direction and at a desired speed. In some implementations, the AGV 704-*i* may include one or more electric motors having any number of stators, poles and/or windings, such as an outrunner or an inrunner brushless direct current (DC) motor, or any other motors, having any speed rating, power rating or any other rating.

The steering system 772-*i* may be any system for controlling a direction of travel of the AGV 704-*i*. The steering system 772-*i* may include any number of automatically operable gears (e.g., racks and pinions), gear boxes, shafts, shaft assemblies, joints, servos, hydraulic cylinders, linkages or other features for repositioning one or more wheels to cause the AGV 704-*i* to travel in a desired direction.

In some implementations, the AGV 704-*i* may be programmed or configured to perform one or more missions or tasks in an integrated manner. For example, the control system 760-*i* may be programmed to instruct the AGV 704-*i* to travel to an origin, e.g., the fulfillment center 730, and retrieve or receive one or more inventory holders 711, before proceeding to a transfer location. Along the way, the control system 760-*i* may cause the motor 770-*i* to operate at any predetermined speed and cause the steering system 772-*i* to orient the AGV 704-*i* in a predetermined direction or otherwise as necessary to travel along a determined path, e.g., based on information or data received from or stored in the navigation module 766-*i*. The control system 760-*i* may further cause the sensor 762-*i* to capture information or data (including but not limited to imaging data) regarding the AGV 704-*i* and/or its surroundings along the selected route.

Likewise, when the AGV arrives at a transfer location, the control system 760-*i* may cause the doors of the storage compartment to open and instruct the ATU that is accompanying the AGV to transfer an inventory holder from the storage compartment to the transfer location. As part of that transfer, the control system may cause the lift gate of the AGV to move from a raised position to a lowered position, so the ATU can transfer the inventory holder from the AGV to the transfer location, and then raise the lift gate from the lowered position to the raised position so the ATU can return to the interior of the storage compartment. In addition, the control system 760-*i* may determine whether to remain at the transfer location while agents retrieve items from the inventory holder or to depart the transfer location without waiting for the agents to retrieve the items from the inventory holder. In general, the control system 760-*i*, or one or more other components of the AGV 704-*i*, may be programmed or configured as necessary to execute any actions associated with a given task, in accordance with the present disclosure.

As discussed above, and as illustrated in FIG. 7B, each AGV 704-*i* may be accompanied by one or more ATUs 706-*i* that facilitate transfer of inventory holders to and from the storage compartment of the AGV 704-*i*. Similar to the AGVs 704-*i*, each of the ATUs 706-*i* may include one or more computer components such as a processor 771-*i*, a memory 773-*i* and a transceiver 775-*i* in communication with one or more other computer devices that may be connected to the communications network 780, as indicated by line 759-*i*, in order to transmit or receive information in the form of digital or analog data, or for any other purpose. For example, the ATU 706-*i* may receive instructions or other information or data via the transceiver 775-*i* regarding an inventory holder 711 that is to be transferred from a storage compartment of the AGV 704-*i* to a transfer location and/or receive instructions regarding an inventory holder 711 that is to be transferred from a transfer location into the storage compartment of the AGV 704-*i*. The transceiver 775-*i* may be configured to enable the ATU 706-*i* to communicate through one or more wired or wireless means, e.g., wired technologies such as USB or fiber optic cable, or standard wireless protocols such as Bluetooth® or any Wi-Fi protocol, such as over the communications network 780 or directly with the AGV 704-*i*.

The transceiver 775-*i* may further include or be in communication with one or more I/O interfaces, network interfaces and/or input/output devices, and may be configured to allow information or data to be exchanged between one or more of the components of the ATU 706-*i*, or to one or more other computer devices or systems, such as the AGV 704-*i* via the communications network 780 or via direct communication. For example, in some implementations, the transceiver 775-*i* may be configured to coordinate I/O traffic between the processor 771-*i* and one or more onboard or external computer devices or components. The transceiver 775-*i* may perform any necessary protocol, timing or other data transformations in order to convert data signals from a first format suitable for use by one component into a second format suitable for use by another component. In some implementations, the transceiver 775-*i* may include support for devices attached through various types of peripheral buses, e.g., variants of the Peripheral Component Interconnect (PCI) bus standard or the Universal Serial Bus (USB) standard. In some other implementations, functions of the transceiver 775-*i* may be split into two or more separate components, or incorporated directly into the processor 771-*i*.

As is also shown in FIG. 7B, the ATU 706-*i* further includes one or more control systems 783-*i*, as well as one or more sensors 777-*i*, one or more power modules 779-*i*, one or more navigation modules 781-*i*, and a lifting member 789-*i*. Additionally, the ATU 706-*i* further includes one or more motors 785-*i*, and one or more steering systems 787-*i*.

The control system 783-*i* may include one or more software applications or hardware components configured for controlling or monitoring operations of one or more components such as the sensor 777-*i*, the power module 779-*i*, the navigation module 781-*i*, or the user interfaces 789-*i*, as well as the motors 785-*i*, and the steering systems 787-*i*, by receiving, generating, storing and/or transmitting one or more computer instructions to such components. The control system 783-*i* may communicate with the marketplace 710, the fulfillment center 730, agents 787, inventory holders 711, and/or the AGVs 704-*i* over the communications network 780, as indicated by line 758-*i*, through the sending and receiving of digital data.

The sensor 777-*i* may be a position sensor such as a GPS receiver in communication with one or more orbiting satellites or other components of a GPS system 785, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or GIS data), of the ATU 706-*i*. Geolocations of the sensor 777-*i* may be associated with the ATU 706-*i*, where appropriate.

The sensor 777-*i* may also be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the ATU 706-*i*, or for any other purpose. For example, the sensor 777-*i* may be configured to capture or detect reflected light if the reflected light is within a field of view of the sensor 777-*i*, which is defined as a function of a distance between an imaging sensor and a lens within the sensor 777-*i*, viz., a focal length, as well as a location of the sensor 777-*i* and an angular orientation of the lens. Accordingly, where an object appears within a depth of field, or a distance within the field of view where the clarity and focus is sufficiently sharp, the sensor 777-*i* may capture light that is reflected off objects of any kind to a sufficiently high degree of resolution using one or more sensors thereof, and store information regarding the reflected light in one or more data files.

The sensor 777-*i* may also include manual or automatic features for modifying a field of view or orientation. For example, the sensor 777-*i* may be a digital camera configured in a fixed position, or with a fixed focal length (e.g., fixed-focus lenses) or angular orientation. Alternatively, the sensor 777-*i* may include one or more actuated or motorized features for adjusting a position of the sensor 777-*i*, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 777-*i*, or a change in one or more of the angles defining the angular orientation of the sensor 777-*i*.

For example, the sensor 777-*i* may be an imaging device that is hard-mounted to a support or mounting that maintains the imaging device in a fixed configuration or angle with respect to one, two or three axes. Alternatively, however, the sensor 777-*i* may be provided with one or more motors and/or controllers for manually or automatically operating one or more of the components, or for reorienting the axis or direction of the sensor 777-*i*, i.e., by panning or tilting the sensor 777-*i*. Panning the sensor 777-*i* may cause a rotation within a horizontal plane or about a vertical axis (e.g., a yaw), while tilting the sensor 777-*i* may cause a rotation within a vertical plane or about a horizontal axis (e.g., a pitch). Additionally, the sensor 777-*i* may be rolled, or rotated about its axis of rotation, and within a plane that is perpendicular to the axis of rotation and substantially parallel to a field of view of the sensor 777-*i*.

Imaging data (e.g., still or moving images, as well as associated audio data or metadata) captured using the sensor 777-*i* may be processed according to any number of recognition techniques. In some implementations, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensor 777-*i* may further be one or more compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), accelerometers, ranging sensors (e.g., radar or LIDAR ranging sensors) or sound sensors (e.g., microphones, piezoelectric sensors, vibration sensors or other transducers for detecting and recording acoustic energy from one or more directions).

The sensor 777-*i* may also be an item identification sensor and may include a bar code scanner, RFID reader, or other technology that is utilized to determine an identification of an inventory holder 711 that is being retrieved or deposited, or has been retrieved or deposited, by the ATU 706-*i* and/or otherwise placed in the storage compartment of the corresponding AGV 704-*i*, and/or otherwise placed at a transfer location.

The sensor 777-*i* may be further configured to capture, record and/or analyze information or data regarding its positions, velocities, accelerations or orientations of the ATU 706-*i*, and to analyze such data or information by one or more means, e.g., by aggregating or summing such data or information to form one or more qualitative or quantitative metrics of the movement of the sensor 777-$i$. For example, a net vector indicative of any and all relevant movements of the ATU 706-$i$, including but not limited to physical positions, velocities, accelerations or orientations of the sensor 777-$i$, may be derived. Additionally, coefficients or scalars indicative of the relative movements of the ATU 706-$i$ may also be defined.

The power module 779-$i$ may be any type of power source for providing electrical power, mechanical power or other forms of power in support of one or more electrical or mechanical loads aboard the ATU 706-$i$. In some implementations, the power module 779-$i$ may include one or more batteries or other power cells, e.g., dry cell or wet cell batteries such as lead-acid batteries, lithium ion batteries, nickel cadmium batteries or nickel metal hydride batteries, or any other type, size or form of batteries. The power module 779-$i$ may each have any cell voltages, peak load currents, charge times, specific energies, internal resistances or cycle lives, or other power ratings. The power module 779-$i$ may also be any type, size or form of other power source, e.g., other than a battery, including but not limited to or more fuel cells, turbines, solar cells or nuclear reactors. Alternatively, the power module 779-$i$ may be another form of prime mover (e.g., electric, gasoline-powered or any other type of motor) capable of generating sufficient mechanical forces for the ATU 706-$i$.

The navigation module 781-$i$ may receive inputs from the sensor 777-$i$, e.g., from a GPS receiver, an imaging device or another sensor, and determine an optimal direction and/or an optimal speed of the ATU 706-$i$ as the ATU transitions inventory holders between the storage compartment of the AGV 704-$i$ and a transfer location. The navigation module 781-$i$ may determine a path to be traveled by the ATU 706-$i$, and may provide information or data regarding the determined path to the control system 783-$i$. Likewise, the navigation module may determine a position at a transfer location at which an inventory holder is to be placed by the ATU 706-$i$ and/or the position of an inventory holder at a transfer location that is to be retrieved by the ATU 706-$i$.

The lifting member 789-$i$ may be configured to extend or retract from the frame of the ATU 706-$i$ to engage and lift an inventory holder 711 and/or to disengage and place an inventory holder 711. Likewise, as discussed above, the lifting member may include an articulation point that allows a lifting plate of the lifting member to remain substantially horizontal even while the ATU is operating on an uneven or inclined surface. In some implementations, the control system 783-$i$ may receive data from a sensor 777-$i$, such as an accelerometer, and determine an angle or adjustment to be made by the articulation point of the lifting member such that an engaged inventory holder 711 remains substantially vertical and stable during transport of the inventory holder 711 by the ATU 706-$i$ The motor 785-$i$ may be any type or form of motor or engine (e.g., electric, gasoline-powered or any other type of motor) that is capable of providing sufficient rotational forces to one or more axles, shafts and/or wheels for causing the ATU 706-$i$ and any engaged inventory holder 711 to travel in a desired direction and at a desired speed. In some implementations, the ATU 706-$i$ may include one or more electric motors having any number of stators, poles and/or windings, such as an outrunner or an inrunner brushless direct current (DC) motor, or any other motors, having any speed rating, power rating or any other rating.

The steering system 787-$i$ may be any system for controlling a direction of travel of the ATU 706-$i$. The steering system 787-$i$ may include any number of automatically operable gears (e.g., racks and pinions), gear boxes, shafts, shaft assemblies, joints, servos, hydraulic cylinders, linkages or other features for repositioning one or more wheels to cause the ATU 706-$i$ to travel in a desired direction.

In some implementations, the ATU 706-$i$ may be programmed or configured to perform one or more missions or tasks in an integrated manner. For example, the control system 783-$i$ may be programmed to instruct the ATU 706-$i$ to travel to a position beneath an inventory holder positioned within the storage compartment of the AGV 704-$i$, engage and lift the inventory holder 711 by moving the lifting member into an extended position, and transfer the inventory holder from the storage compartment of the AGV 704-$i$ to a position at a transfer location. Along the way, the control system 783-$i$ may cause the motor 785-$i$ to operate at any predetermined speed and cause the steering system 787-$i$ to orient the ATU 706-$i$ in a predetermined direction or otherwise as necessary to travel along a determined path, e.g., based on information or data received from or stored in the navigation module 781-$i$. The control system 783-$i$ may further cause the sensor 777-$i$ to capture information or data (including but not limited to imaging data) regarding the ATU 706-$i$ and/or its surroundings along the path. When the ATU arrives at the position at the transfer location, the control system 783-$i$ may cause the ATU to lower and disengage the inventory holder 711 and navigate back into the storage compartment of the AGV 704-$i$.

In some implementations, the control system 783-$i$ of the ATU 706-$i$, the control system 760-$i$ of the AGV 706-$i$ and/or the vehicle monitoring system may communicate with the agents 787 to notify the agents that the inventory holder 711 is arriving and/or positioned at the transfer location. The agents 787 may be any type of human, autonomous vehicle (e.g., autonomous ground vehicle, autonomous air vehicle (e.g., unmanned aerial vehicle), autonomous water based vehicle, etc. As illustrated above, humans may utilize one or more vehicles to facilitate final delivery of the items. Likewise, the agents may communicate with the AGVs 704, ATUs 706, customers 740, etc., using one or more computers 782, which may be executing an application 784. The application 784 may also provide information to the agent necessary to access a compartment of the inventory holder that contains the items to be delivered by the user and/or to receive information as to the delivery destinations to which the items are to be delivered. In some implementations, the agent may provide an indication, through the application 784 and/or through the interface on the inventory holder 711 to access a compartment of the inventory holder and/to provide an indication that the agent 787 has retrieved the items from the inventory holder 711. Likewise, the computer 782 of the agent may include one or more location determining components, such as a GPS 786 that may provide information to the AGV, ATU, vehicle monitoring system, etc., indicating a location or position of the agent.

The inventory holder 711, as discussed above, may include a computing system that may be used to determine when all items have been removed from the inventory holder and/or to transmit to the vehicle monitoring system 790, or to one or more AGVs 704-$i$, that the inventory holder as available for retrieval. For example, once the computing system of the inventory holder has determined that all agents have retrieved the items to be delivered by those agents from the inventory holder, and the inventory holder is empty, the inventory holder 711 may transmit via the network 780 an indication that the inventory holder is available for retrieval. The retrieval indication may include, among other information, an inventory holder identifier, and optionally a location of the inventory holder.

Any combination of networks or communications protocols may be utilized in accordance with the systems and methods of the present disclosure. For example, each of the AGVs 704-1, 704-2 . . . 704-*n* and/or ATUs 706-*i* may be configured to communicate with one another or with the marketplace server 712, the fulfillment center server 732 and/or the customer computer 742 via the communications network 780, such as is shown in FIGS. 7A and 7B, e.g., via an open or standard protocol such as Wi-Fi. Alternatively, each of the AGVs 704-1, 704-2 . . . 704-*n* and/or ATUs 706-*i* may be configured to communicate with one another directly outside of a centralized network, such as the communications network 780, e.g., by a wireless protocol such as Bluetooth, in which two or more of the AGVs 704-1, 704-2 . . . 704-*n* and/or ATUs 706-*i* may be paired with one another.

The vehicle monitoring system 790 includes one or more physical computer servers 792 having a plurality of databases 794 associated therewith, as well as one or more computer processors 796 provided for any specific or general purpose. The servers 792 may be connected to or otherwise communicate with the databases 794 and the processors 796. The databases 794 may store any type of information or data. The servers 792 and/or the computer processors 796 may also connect to or otherwise communicate with the communications network 780, as indicated by line 798, through the sending and receiving of digital data. For example, the vehicle monitoring system 790 may include any facilities, stations or locations having the ability or capacity to receive and store information or data in one or more data stores, e.g., data files received from any of the AGVs 704-1, 704-2 . . . 704-*n*, one or more other external computer systems (not shown) via the communications network 780. In some implementations, the data processing system 790 may be provided in a physical location. In other such implementations, the data processing system 790 may be provided in one or more alternate or virtual locations, e.g., in a "cloud"-based environment. In still other implementations, the vehicle monitoring system 790 may be provided onboard one or more of the AGVs 704-1, 704-2 . . . 704-*n*.

In some implementations, the vehicle monitoring system 790 of FIG. 7A may also be provided for the purpose of receiving, tracking and/or otherwise monitoring the operations of one or more of the AGVs 704-1, 704-2 . . . 704-*n* and/or ATUs 706-*i* including but not limited to any information or data regarding attributes of the AGVs 704-1, 704-2 . . . 704-*n*, or missions or tasks being performed by the AGVs 704-1, 704-2 . . . 704-*n*, and/or ATUs 706-*i* as well as environmental conditions, traffic conditions, ground or surface conditions, weather conditions, planned or ongoing construction or other events, or any other factors that may affect the capacity of one or more paths within a navigable path network.

For example, the vehicle monitoring system 790 may receive information or data regarding a mission or task to be performed, e.g., delivery of inventory holders to various transfer locations and/or retrieval of inventory holders from transfer locations, and may identify a plurality of routes between the transfer locations, the route having various paths between transfer locations, and may select one or more of such paths for the execution of the mission or task by one or more of the AGVs 704-1, 704-2 . . . 704-*n*. The vehicle monitoring system 790 may further provide instructions to one or more of the AGVs 704-1, 704-2 . . . 704-*n*, indicating a path or route to be traveled between two or more transfer locations, and/or other points, including times and dates at which an AGV has arrived at or departed from one or more of such transfer locations and/or a time or date when an inventory holder is available for retrieval at a transfer location. The vehicle monitoring system 790 may be further configured to receive information or data regarding changes to any of the attributes regarding a given mission or task, changes to any of the attributes of any of the AGVs 704-1, 704-2 . . . 704-*n*, or changes to any of the attributes of the physical and/or geographic features of the environment. Information or data regarding such changes may be received from any intrinsic or extrinsic sources, including but not limited to one or more networked computer systems, e.g., over the communications network 780, or from one or more of the AGVs 704-1, 704-2 . . . 704-*n*. For example, the vehicle monitoring system 790 may include information or data such as a speed, a course, a position (e.g., a latitude and a longitude), an elevation, an angle of orientation (e.g., a yaw, a pitch or a roll) of an AGV, as well as information or data regarding environmental or surface conditions, traffic conditions, congestion or any other relevant factors regarding the capacity of a given path.

The vehicle monitoring system 790 may also be configured to determine whether a path being traveled by one or more of the AGVs 704-1, 704-2 . . . 704-*n* remains optimal or preferred for a given AGV, or to communicate instructions for varying the path. The vehicle monitoring system 790 may be further utilize any available information or data in determining a capacity of a given path, or whether such capacity may have increased or decreased. The number and/or type of information or data that may be received and/or processed or utilized by the vehicle monitoring system 790 are not limited.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "fulfillment center" a "customer," an "autonomous vehicle," a "vehicle monitoring system" or like terms, may be automated steps performed by their respective computer systems, or implemented within software modules (or computer programs) executed by one or more general purpose computers. Moreover, process steps described as being performed by a "marketplace," a "fulfillment center," a "customer," an "autonomous vehicle" or a "vehicle monitoring system" may be typically performed by a human operator, but could, alternatively, be performed by an automated agent.

The marketplace 710, the fulfillment center 730, the customer 740, the AGVs 704-1, 704-2 . . . 704-*n*, the ATUs 706-*i*, the agents 787 or the vehicle monitoring system 790 may use any web-enabled or Internet applications or features, or any other client-server applications or features including electronic mail (or E-mail), or other messaging techniques, to connect to the communications network 780 or to communicate with one another, such as through short or multimedia messaging service (SMS or MMS) text messages. For example, the fulfillment center 730 and/or the server 732 may be adapted to transmit information or data in the form of synchronous or asynchronous messages to the marketplace 710 and/or the server 712, the customer 740 and/or the computing device 742, the AGVs 704-1, 704-2 . . . 704-$n$, the control system 760-$i$ or the vehicle monitoring system 790, the agents 787, and/or the ATUs 706-$i$, and/or any other computer device in real time or in near-real time, or in one or more offline processes, via the communications network 780. Those of ordinary skill in the pertinent art would recognize that the marketplace 710, the fulfillment center 730, the customer 740, the AGVs 704-1, 704-2 . . . 704-$n$, the agents 787, the inventory holders 711, the ATUs 706-$i$ or the vehicle monitoring system 790 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 712, 732, 792, the computing devices 742, the processors 752-$i$, 796, or any other computers or control systems utilized by the marketplace 710, the fulfillment center 730, the customer 740, the AGVs 704-1, 704-2 . . . 704-$n$, the ATUs 706-$i$, the agents 787, the inventory holders 711, the vehicle monitoring system 790, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, autonomous vehicles traveling throughout a navigable path network may remain in communication with a vehicle monitoring system or other networked computer systems. The autonomous vehicles may transmit information or data (e.g., imaging data of any type or form) regarding their past, present or future operations to the vehicle monitoring system, e.g., their respective speeds, courses, positions (e.g., latitudes and longitudes), elevations or angles of orientation (e.g., yaws, pitches or rolls), as well as environmental or surface conditions, traffic conditions, congestion or any other relevant factors encountered by the autonomous vehicles to the vehicle monitoring system or other networked computer systems.

Figure 8:
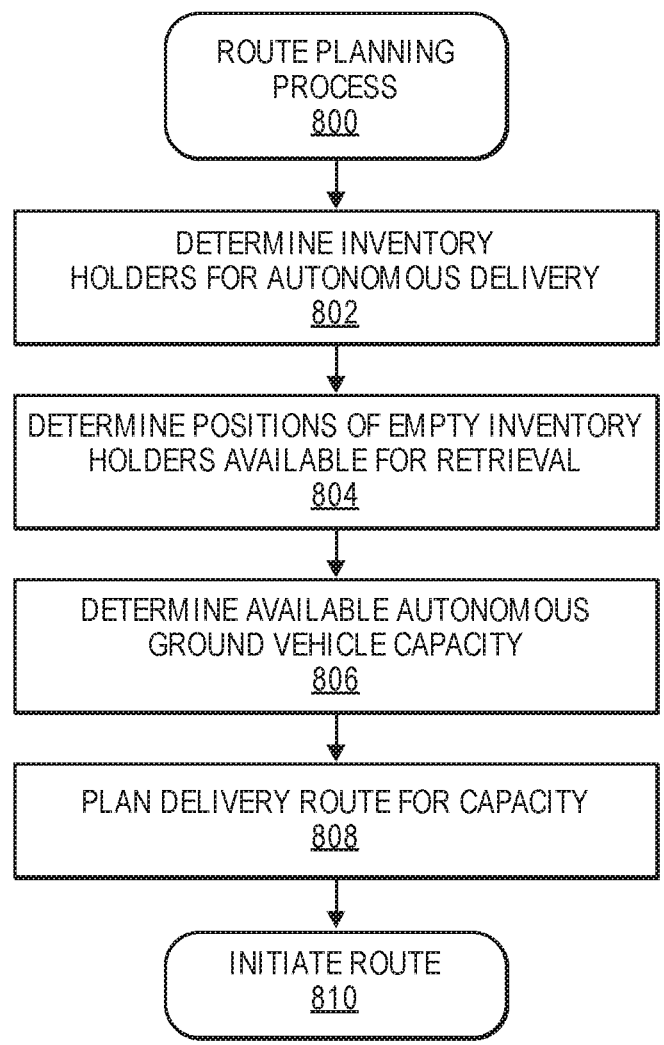
FIG. 8 is a flow diagram of an example route planning process, in accordance with implementations of the present disclosure.

FIG. 8 is a flow diagram of an example route planning process 800, in accordance with implementations of the present disclosure. As discussed above, the route planning process 800 may be performed by one or more AGVs, and/or by a vehicle monitoring system, and/or by a combination of one or more AGVs working with the vehicle monitoring system.

The example process 800 begins by determining inventory holders that are available at a fulfillment center for autonomous delivery to one or more transfer locations, as in 802. An inventory holder may be considered available when, for example, it has been filled with all items to be delivered to delivery destinations within a region served from a transfer location. In some instances, multiple inventory holders to be delivered to different transfer locations may be available for delivery.

In addition to determining inventory holders available for delivery to a transfer location, a determination may be made as to empty inventory holders that are out in the field at different transfer locations and available for retrieval by an AGV, as in 804. Likewise, an AGV available capacity may be determined that indicates the number of inventory holders that may be loaded into an available AGV and transported by the AGV, as in 806. For example, if an AGV has a storage compartment that can contain eight inventory holders and the storage compartment is empty, it has a capacity of eight inventory holders. However, as inventory holders are loaded into the storage compartment of the AGV, either at a fulfillment center or by an ATU while the AGV is at a transfer location, the capacity of the AGV will decrease. Conversely, when inventory holders are transferred out of the storage compartment of the AGV, either at a transfer location or at a fulfillment center (which is also considered a transfer location), the capacity of the AGV will increase. As such the capacity of the AGV may change as the AGV navigates a route and delivers and/or retrieves inventory holders.

Based on the determined capacity of the AGV, the inventory holders available for retrieval or delivery, a route is planned that identifies the transfer locations at which those inventory holders are to be delivered and/or from which inventory holders are to be retrieved, as in 808. In some implementations, planning of the route may include planning of the specific paths to be travelled by the AGV between the transfer locations. In other implementations, planning of the route may include indicating the transfer locations to which the AGV is to travel and indication as to whether capacity of the AGV is to increase or decrease at each transfer location. In such an implementation, the AGV may receive the route and plan paths between the different transfer locations that factors in, among other information, capacity of the AGV, location of the transfer locations, delivery commitments for items contained on the inventory holders, traffic, weather, etc.

Finally, once the route is planned, a first path along the route from a current location of the AGV to a first transfer location is initiated, as in 810.

As discussed herein, a fulfillment center may be considered a transfer location and route planning may be performed for an AGV that is currently at the fulfillment center and/or for an AGV that is in the field navigating between transfer locations or positioned at a transfer location. In implementations in which an AGV is in the field, the route planning process 800 will determine capacity of the AGV based on any other stops at transfer locations to be made between the current location of the AGV and the fulfillment center/transfer location, as well as consider the number of inventory holders that will be transferred off of the AGV when the AGV arrives at the fulfillment center.

Figure 9:
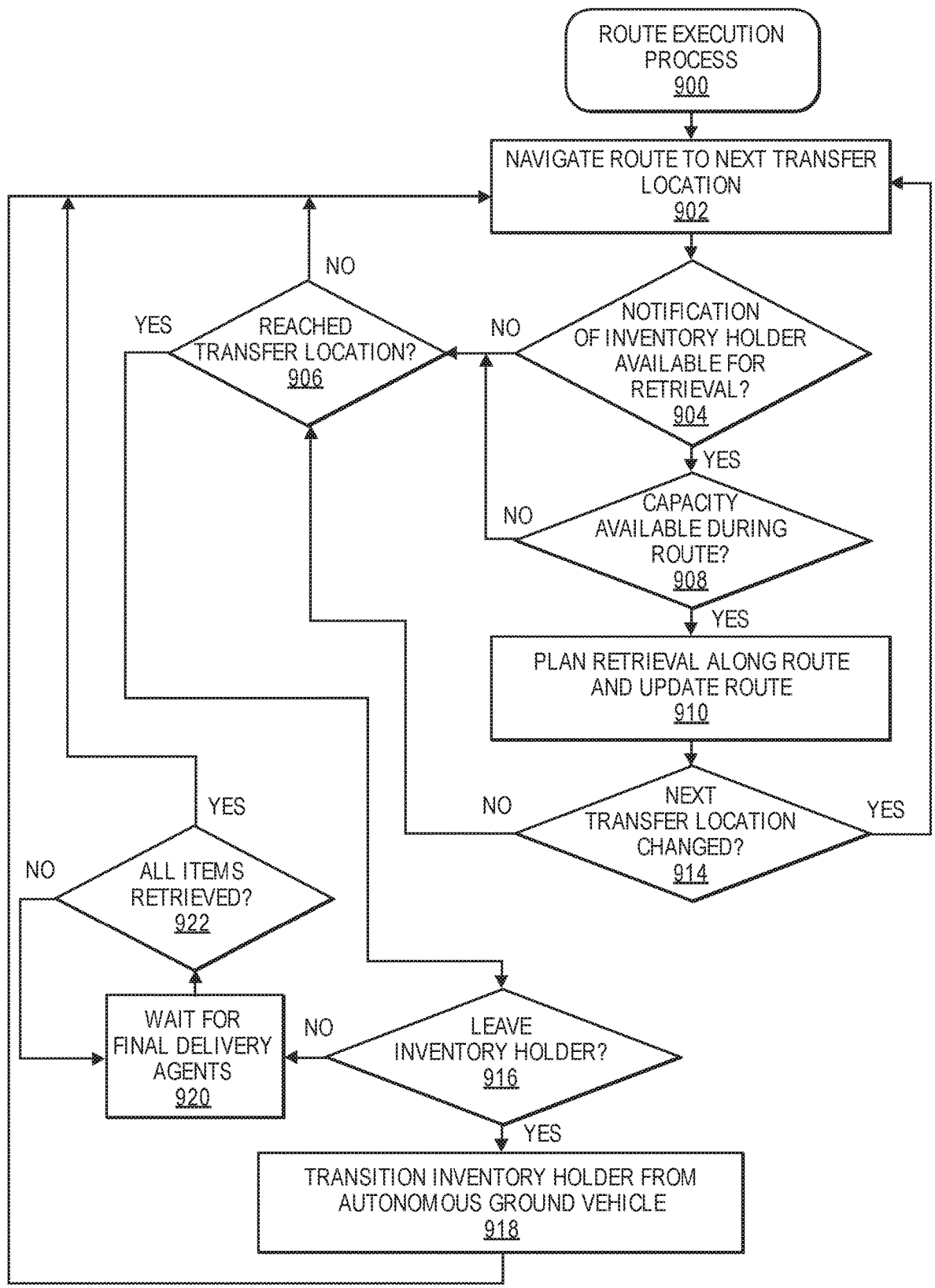
FIG. 9 is a flow diagram of an example route execution process, in accordance with implementations of the present disclosure.

FIG. 9 is a flow diagram of an example route execution process 900, in accordance with implementations of the present disclosure. The example process 900 begins as an AGV begins or is planning to begin navigation to a next transfer location, as in 902. As part of the planning, a determination is made as to whether a notification has been received of an inventory holder that is available for retrieval, as in 904. An inventory holder may be available for retrieval if it is at a transfer location and has had all items removed by agents that are to be removed while at that transfer location. Alternatively, an inventory holder may be available for retrieval from a transfer location if that transfer location is a fulfillment center and the inventory holder is full and to be delivered to another transfer location. From the perspective of the route planning and execution process, it may not matter whether the inventory holder is full or empty, the only indications necessary may be a location of the transfer location from which the inventory holder is to be retrieved and a location of the transfer location to which the inventory holder is to be delivered.

If it is determined that a notification has not been received, it is determined whether the AGV has reached the next transfer location, as in 906. If the AGV has not reached the next transfer location, the example process 900 returns to block 902 and continues as the AGV is navigating a path to the transfer location. If it is determined that the AGV has reached a transfer location, it may be determined whether the AGV is to deliver the inventory holder to the transfer location and depart without waiting for the agents to retrieve the items from the inventory holder, as in 916. In some implementations, if the transfer location is a manned location or if it is determined that all agents are present at the transfer location and available to retrieve the items such that the AGV would not have to remain at the transfer location for more than a defined period of time (e.g., ten minutes) while the items are removed, it may be determined that the AGV is to remain at the transfer location while the items are removed from the inventory holder so that the AGV can take the inventory with it as it continues along its route. However, if the time required to wait for the agents exceeds the defined period of time, or is unknown, it may be determined that the AGV is to leave the inventory holder at the transfer location and continue along the route to a next transfer location. In some implementations, the determination of whether to leave the inventory holder at the transfer location may always be a positive indication and the AGV may always deliver inventory holders to transfer locations and depart without waiting for agents to retrieve items from the inventory holder.

If it is determined that the AGV is to deliver the inventory holder and depart without waiting for the agents to retrieve the inventory items from the inventory holder, the AGV works in conjunction with the ATU that accompanies the AGV to transition the inventory holder from the AGV to a position at the transfer location, as in 918. As discussed above, the ATU that is accompanying the AGV may engage the inventory holder and transition the inventory holder from the storage compartment of the AGV to a position at the transfer location. Once the inventory holder has been transferred from the AGV to the transfer location, and the ATU has returned to the AGV, the example process 900 returns to block 902 and continues.

If it is determined at decision block 916 that the AGV is to remain at the transfer location and await agent retrieval of the items from the inventory holder, the inventory holder may be transitioned from the AGV and the ATU may remain with the inventory holder while the items are removed from the inventory holder. Once the items are all removed, the ATU may transition the inventory holder back into the AGV. Alternatively, the inventory holder may remain in the AGV with the items are unloaded from the inventory holder.

The AGV waits from the agents to retrieve the items, as in 920, and periodically determines whether all items have been retrieved, as in 922. Similar to an inventory holder sending a notification that it is available for retrieval, it may be determined that all items have been retrieved from the inventory holder when the inventory holder sends the notification that it is available for retrieval. If it is determined at block 922 that all items have not yet been retrieved from the inventory holder, the example process 900 returns to block 920 and continues. In some implementations, there may be a maximum time (e.g., ten minutes) that the AGV will await retrieval of the items from the inventory holder. In such an implementation, if the maximum time has been reached and all items have not been retrieved, the ATU may return to the AGV and the AGV may depart without the inventory holder, leaving the inventory holder at the transfer location. If it is determined at decision block 922 that all items have been retrieved, the ATU returns the inventory holder to the AGV storage compartment and the example process 900 returns to block 902 and continues.

Returning to decision block 904, if it is determined that a notification of an inventory available for retrieval has been received, a determination is made as to whether the AGV has capacity during the route to retrieve the inventory holder, as in 908. As discussed above, the capacity of the AGV changes along a route as inventory holders are delivered to and/or retrieved from transfer locations. If it is determined that the AGV has capacity to retrieve the inventory holder, a retrieval of the inventory holder is planned along the route, as in 910. Planning retrieval may include determining a position along the route between two other transfer locations at which the inventory holder is to be retrieved and/or determining new paths between existing planned transfer locations and the transfer location from which the inventory holder is to be retrieved. Such planning will consider the capacity of the AGV at different points along the route, locations of other transfer locations, the location of the transfer location from which the inventory holder is to be retrieved and the location of the transfer location where the inventory holder is to be delivered.

A determination is then made as to whether the next transfer location to which the AGV is to navigate has changed, as in 914. The next transfer location may change if, for example, the transfer location from which the inventory holder is to be retrieved becomes the next transfer location. If it is determined that the next transfer location has changed, the example process 900 returns to block 902 and begins navigation toward what is now the next transfer location. However, if it is determined that the next transfer location has not changed, the example process transitions to decision block 906 and continues, as discussed above.

The information or data that may be captured and reported by one or more autonomous vehicles, or obtained from any intrinsic or extrinsic sources, and utilized with the present disclosure is not limited. For example, such information or data may be qualitative in nature, e.g., courses, speeds, elevations, positions, angles of orientation, times or dates of arrival or departure, battery life, fuel levels or carrying capacities expressed in numeric terms. The information or data may also be qualitative in nature, e.g., courses, speeds, elevations, positions, angles of orientation, times or dates of arrival or departure, battery life, fuel levels or carrying capacities expressed in words such as "northeast," "south," "slow," "fast," "high," "valley," "waypoint," "tilt," "Sunday," "full charge" or "half tank."

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 8 or 9, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system, comprising:
 a first inventory holder containing a first plurality of items to be delivered to a first plurality of delivery destinations by one or more first agents;
 a second inventory holder containing a second plurality of items to be delivered to a second plurality of delivery destinations by one or more second agents;
 an autonomous ground vehicle ("AGV") operable to autonomously transport at least the first inventory holder and the second inventory holder, the AGV including:
  one or more processors; and
  a memory coupled with the one or more processors and including program instructions that, when executed by the one or more processors, cause the one or more processors to at least:
   receive a first indication of a first transfer location at which the first inventory holder is to be delivered and a second indication of a second transfer location at which the second inventory holder is to be delivered;
   determine that the first inventory holder is to be delivered at the first transfer location and that the AGV is to depart the first transfer location without waiting for the one or more first agents to retrieve the first plurality of items from the first inventory holder;
    cause the AGV to autonomously navigate from a current location to the first transfer location;
    send an instruction to an autonomous transition unit ("ATU") carried by the AGV to transfer the first inventory holder from the AGV to the first transfer location; and
    cause, upon completion of the transfer of the first inventory holder from the AGV to the first transfer location and without waiting for the one or more first agents to retrieve the first plurality of items; the AGV to autonomously navigate away from the first transfer location and toward the second transfer location at which the second inventory holder is to be delivered; and
    a notification to be sent to each of the one or more first agents that items are available at the first transfer location for retrieval and delivery to the first plurality of delivery destinations.

2. The system of claim 1, wherein the AGV includes:
a storage compartment within an interior of the AGV, operable to receive a plurality of inventory holders, including the first inventory holder and the second inventory holder; and
a lift gate along at least a portion of a perimeter of the AGV, the lift gate positionable between a raised position that is approximately at a same level as a base of the interior of the AGV and a lowered position in which the lift gate contacts a surface upon which the AGV is traveling, the lift gate configured to at least:
    raise or lower the ATU and the first inventory holder carried by the ATU between the raised position and the lowered position such that the ATU can transfer the first inventory holder between the interior of the AGV and the first transfer location.

3. The system of claim 1, wherein:
the AGV includes a storage compartment within an interior of the AGV, operable to receive a plurality of inventory holders, including the first inventory holder and the second inventory holder; and
the ATU, in response to the instruction to transfer the first inventory holder from the AGV to the first transfer location, is operable to at least:
    autonomously disengage from the AGV;
    autonomously navigate to an open portion of the storage compartment;
    autonomously lift an inventory holder using a lifting mechanism of the ATU;
    autonomously remove the inventory holder from the storage compartment; and
    autonomously place the inventory holder at the first transfer location.

4. The system of claim 1, wherein the first inventory holder includes:
a plurality of storage compartments, at least one of the plurality of storage compartments of a size sufficient to receive at least one item of the first plurality of items; and
wherein the at least one of the plurality of storage compartments includes a door to prohibit access to an interior of the at least one of the plurality of storage compartments when the door is in a closed and locked position.

5. A method, comprising:
navigating, with an automated ground vehicle ("AGV"), a first path of a route to a first transfer location;
transferring, from the AGV to the first transfer location, a first inventory holder, the first inventory holder containing a plurality of items to be delivered to one or more delivery destinations by one or more first agents;
determining a second transfer location from which a second inventory holder is to be transferred from the second transfer location into the AGV;
planning a second path of the route from the first transfer location to the second transfer location;
navigating, upon completion of the transfer of the first inventory holder from the AGV to the first transfer location and without waiting for the one or more first agents to retrieve the plurality of items, by the AGV, away from the first transfer location and along the second path;
subsequent to navigating, by the AGV, away from the first transfer location, receiving an indication that the first inventory holder is available for retrieval; and
determining that the AGV has capacity along the route to retrieve the first inventory holder; and
updating the route to include a third path to the first transfer location to retrieve the first inventory holder.

6. The method of claim 5, further comprising:
transferring, from the second transfer location to the AGV, the second inventory holder;
determining a third transfer location at which a third inventory holder contained in the AGV is to be transferred from the AGV to the third transfer location;
planning a third path of the route from the second transfer location to the third transfer location; and
navigating, upon completion of the transfer of the second inventory holder from the second transfer location into the AGV, by the AGV, away from the second transfer location and along the third path.

7. The method of claim 6, further comprising:
receiving, during navigation along the third path, an indication that a fourth inventory holder at a fourth transfer location is available for retrieval;
determining a fourth path along the route during which the AGV will have capacity to receive the fourth inventory holder; and
updating the route to include a fifth path to the fourth transfer location when the AGV has capacity to retrieve the fourth inventory holder.

8. The method of claim 5, further comprising:
sending, to each of the one or more first agents, a notification that items are available at the first transfer location for retrieval and delivery to the one or more delivery destinations.

9. The method of claim 5, further comprising:
sending to each of the one or more first agents, an access code needed to access an interior of the first inventory holder and retrieve at least one of the plurality of items.

10. The method of claim 5, wherein each of the plurality of items is an item ordered by a customer from an electronic commerce website and each of the one or more delivery destinations are specified by a respective customer.

11. The method of claim 5, further comprising:
sending to an agent an access code needed to access an interior of the first inventory holder and return an item into the first inventory holder.

12. The method of claim 5, wherein transferring the first inventory holder further includes:
sending an instruction to an autonomous transfer unit ("ATU") to transfer the first inventory holder from the AGV to the first transfer location, wherein the ATU is at least one of an autonomous vehicle operable to navigate within an interior of the AGV and move the first inventory holder, an autonomous vehicle operable to navigate around an exterior of the AGV and move the first inventory holder from the interior of the AGV to the first transfer location, or a robotic component of the AGV operable to move the first inventory holder from the interior of the AGV to the first transfer location.

13. The method of claim 5, wherein:

the route indicates a plurality of transfer locations, including the first transfer location, at which the AGV is to transfer an inventory holder contained in the AGV from the AGV to the respective transfer location; and wherein paths along the route between respective transfer locations are determined by a component of the AGV.

14. An autonomous ground vehicle ("AGV") apparatus, comprising:

a power supply;

a communication component;

a motor operable to propel the AGV along a path between a first transfer location and a second transfer location;

a navigation component operable to navigate the AGV along the path;

a storage compartment configured to receive and secure transport of one or more inventory holders;

an autonomous transition unit ("ATU") operable to transfer one or more inventory holders into or out of the storage compartment of the AGV, wherein the ATU is separable from the AGV and includes:

a second motor capable of propelling the ATU independent of the AGV;

a frame having a height that is less than a height of a base of a first inventory holder such that the ATU can propel itself and be positioned beneath the first inventory holder; and a lifting member positionable between a retracted position and an extended position, such that the ATU can lift the first inventory holder off the base of an interior of the AGV when the lifting member is in the extended position; and a control system configured to at least:

determine the path between the first transfer location and the second transfer location;

cause the navigation component to navigate the AGV along the path;

cause the ATU to transfer the first inventory holder contained in the storage compartment from the storage compartment to the first transfer location;

determine that the AGV is to depart the first transfer location without waiting for one or more first agents to retrieve items from the first inventory holder; and cause, upon completion of the transfer of the first inventory holder from the AGV to the first transfer location and without waiting for the one or more first agents to retrieve items from the first inventory holder, the AGV to autonomously navigate away from the first transfer location.

15. The AGV apparatus of claim 14, further comprising:

a side door movable between an open position and a closed position to enable or prohibit access to the storage compartment of the AGV.

16. The AGV apparatus of claim 14, further comprising:

a lift gate coupled to an exterior of the AGV, the lift gate positionable between a raised position that is approximately at a same level as a base of an interior of the storage compartment and a lowered position in which the lift gate contacts a surface upon which the AGV is traveling, the lift gate configured to at least:

raise or lower the ATU and the first inventory holder carried by the ATU between the raised position and the lowered position such that the ATU can transfer the first inventory holder to the first transfer location.

17. The AGV apparatus of claim 14, wherein the first transfer location is at least one of a parking space, a position on a street, a driveway, a sidewalk, a field, a secured location, an unsecured location, an indoor location, or an outdoor location.

18. The AGV apparatus of claim 14, wherein the lifting member further includes:

an articulation point operable to adjust a position of at least a portion of the lifting member so that a lifting plate of the lifting member remains approximately horizontal.

* * * * *